US010545986B2

(12) United States Patent
Tappan et al.

(10) Patent No.: US 10,545,986 B2
(45) Date of Patent: Jan. 28, 2020

(54) SYSTEMS AND METHODS FOR DYNAMICALLY GROUPING DATA ANALYSIS CONTENT

(71) Applicant: General Electric Company, Schenectady, NY (US)

(72) Inventors: Jacqueline Marie Tappan, Minden, NV (US); Ryan Gregory Roaldson, Minden, NV (US)

(73) Assignee: General Electric Company, Schenectady, NY (US)

( * ) Notice: Subject to any disclaimer, the term of this patent is extended or adjusted under 35 U.S.C. 154(b) by 207 days.

(21) Appl. No.: 14/141,736

(22) Filed: Dec. 27, 2013

(65) Prior Publication Data

US 2015/0186483 A1 Jul. 2, 2015

(51) Int. Cl.
*G06F 16/00* (2019.01)
*G06Q 10/00* (2012.01)
(Continued)

(52) U.S. Cl.
CPC ............ *G06F 16/26* (2019.01); *G06F 3/0481* (2013.01); *G06F 16/168* (2019.01);
(Continued)

(58) Field of Classification Search
CPC . G06T 2200/24; G06T 11/206; G06N 99/005; F24J 2003/089; G06Q 10/0639;
(Continued)

(56) References Cited

U.S. PATENT DOCUMENTS 6,053,047 A * 4/2000 Dister ................. G01M 13/028
73/593
6,421,571 B1 * 7/2002 Spriggs ................. G05B 15/02
345/629
(Continued)

FOREIGN PATENT DOCUMENTS

EP 2204705 A1 7/2010
EP 2570879 A2 3/2013
(Continued)

OTHER PUBLICATIONS

PCT Search Report and Written Opinion issued in connection with related Application No. PCT/US2014/067348 dated Mar. 9, 2015
(Continued)

*Primary Examiner* — Srirama Channavajjala
(74) *Attorney, Agent, or Firm* — Mintz Levin Cohn Ferris Glovsky and Popeo, P.C.

(57) ABSTRACT

A method for grouping content displayed on a graphical user interface may include displaying selectable components that correspond to types of measurement data associated with a device or a component within the device. The method may then include receiving a selection of one of the selectable components, such that the one of the selectable components corresponds to a portion of the measurement data. The method may then receive a grouping mode input to specify characteristics for display of the portion of the data as data processing outputs. The method may then include displaying the data processing outputs associated with the selection, such that each respective data processing output may include visualizations associated with datasets of the portion of the measurement data. The respective visualizations of the respective data processing output may be displayed together based on an association between the respective datasets and the grouping mode input.

15 Claims, 19 Drawing Sheets

(51) Int. Cl.
*G06F 16/26* (2019.01)
*G06F 16/16* (2019.01)
*G06F 16/28* (2019.01)
*G06F 16/901* (2019.01)
*G06F 16/185* (2019.01)
*G06Q 10/06* (2012.01)
*G06F 3/0481* (2013.01)

(52) U.S. Cl.
CPC .......... *G06F 16/185* (2019.01); *G06F 16/282* (2019.01); *G06F 16/9024* (2019.01); *G06Q 10/06* (2013.01)

(58) Field of Classification Search
CPC ........... G06Q 10/06; G06Q 10/063114; G06Q 10/0633; G05B 23/0256; G05B 23/0272; G05B 23/0294; G06F 11/3409; G06F 11/3452; G06F 11/323; G06F 3/0481; G06F 3/0416; G06F 16/26; G06F 16/168; G06F 16/282; G06F 16/9024; G06F 16/185; G06F 16/0481; F01K 23/10; Y02E 20/16; A61B 5/742
See application file for complete search history.

(56) References Cited

U.S. PATENT DOCUMENTS

| | | | | |
|---|---|---|---|---|
| 6,889,096 B2* | 5/2005 | Spriggs | ............... | G05B 15/02 340/3.71 |
| 7,437,397 B1* | 10/2008 | Koudas | ............... | G06K 9/00536 708/422 |
| 8,280,880 B1* | 10/2012 | Aymeloglu | ............ | G06F 16/248 707/726 |
| 8,463,417 B2* | 6/2013 | Steele | ............... | G05B 23/0216 700/10 |
| 9,524,132 B2* | 12/2016 | Weaver | ............... | G06F 3/1234 |
| 2002/0077711 A1* | 6/2002 | Nixon | ............... | C10G 11/187 700/51 |
| 2002/0082736 A1* | 6/2002 | Lech | ............... | G06Q 10/06 700/108 |
| 2002/0123864 A1* | 9/2002 | Eryurek | ............ | G05B 23/0254 702/188 |
| 2002/0193969 A1* | 12/2002 | Frantz | ............... | F02C 9/00 702/188 |
| 2003/0001896 A1* | 1/2003 | Johnson | ............... | G06F 8/71 715/771 |
| 2003/0023518 A1* | 1/2003 | Spriggs | ............... | G05B 15/02 705/28 |
| 2003/0028269 A1* | 2/2003 | Spriggs | ............... | G05B 15/02 700/83 |
| 2004/0139085 A1 | 7/2004 | Eryurek et al. | | |
| 2005/0197805 A1* | 9/2005 | Eryurek | ............ | G05B 23/0272 702/188 |
| 2006/0095858 A1* | 5/2006 | Hao | ............... | G06F 16/26 715/764 |
| 2006/0241793 A1* | 10/2006 | Skourup | ............... | G05B 17/02 700/83 |
| 2007/0106761 A1* | 5/2007 | Beoughter | ......... | G05B 19/0426 709/219 |
| 2007/0244990 A1* | 10/2007 | Wells | ............... | G06F 16/986 709/218 |
| 2007/0277613 A1* | 12/2007 | Iwatsubo | ............... | F16C 19/527 73/593 |
| 2008/0209078 A1* | 8/2008 | Bates | ............... | G06Q 10/00 710/10 |
| 2008/0306801 A1* | 12/2008 | Musier | ............... | G06Q 10/063 705/7.26 |
| 2009/0012653 A1* | 1/2009 | Cheng | ............... | F23N 5/242 700/287 |
| 2009/0088875 A1* | 4/2009 | Baier | ............... | G05B 19/41865 700/83 |
| 2009/0089225 A1* | 4/2009 | Baier | ............... | G06Q 10/06 706/12 |
| 2009/0222065 A1* | 9/2009 | Dlugos, Jr. | ............... | A61B 5/03 607/60 |
| 2009/0292180 A1* | 11/2009 | Mirow | ............... | G16H 10/20 600/301 |
| 2010/0083164 A1* | 4/2010 | Martin | ............... | G16H 40/63 715/781 |
| 2011/0283231 A1* | 11/2011 | Richstein | ............... | G06F 3/0488 715/810 |
| 2012/0144335 A1* | 6/2012 | Abeln | ............... | G06Q 10/06 715/771 |
| 2012/0283988 A1* | 11/2012 | Pandey | ............... | G06Q 30/06 702/179 |
| 2013/0031509 A1* | 1/2013 | Curtis | ............... | G06F 17/5077 715/810 |
| 2013/0125057 A1* | 5/2013 | Kashik | ............... | G06F 3/04815 715/852 |
| 2014/0189561 A1* | 7/2014 | Alldredge | ............... | G06F 13/10 715/771 |
| 2015/0026622 A1* | 1/2015 | Roaldson | ............... | G06F 3/0484 715/771 |
| 2015/0185718 A1* | 7/2015 | Tappan | ............... | G05B 15/02 700/83 |
| 2018/0321836 A1* | 11/2018 | Tappan | ............... | G05B 23/0272 |

FOREIGN PATENT DOCUMENTS

| | | |
|---|---|---|
| GB | 2438028 A | 11/2007 |
| WO | 02086726 A1 | 10/2002 |
| WO | WO 2009/052657 * | 4/2009 |

OTHER PUBLICATIONS

PCT Search Report and Written Opinion issued in connection with corresponding PCT Application No. PCT/US2014/065603 dated May 4, 2015.
U.S. Appl. No. 13/946,568, filed Jul. 19, 2013, Roaldson et al.
Tappan, J.M. et al., Systems and methods for dynamically grouping data analysis content, GE co-pending U.S. Appl. No. 16/024,035, filed Jun. 29, 2018.

* cited by examiner

SYSTEMS AND METHODS FOR DYNAMICALLY GROUPING DATA ANALYSIS CONTENT

BACKGROUND

The subject matter disclosed herein relates to systems and methods for grouping content presented on a graphical user interface (GUI) of a condition monitoring system. More specifically, the subject matter disclosed herein relates to dynamically grouping the content displayed on the GUI based on real-time input received by the GUI.

Industrial monitoring systems, such as asset condition monitoring systems, generally provide monitoring capabilities for various types of mechanical devices and systems. For example, an industrial monitor may monitor one or more operational parameters of a gas turbine system. Here, the industrial monitoring system may include a number of sensors (e.g., temperature sensors, pressure sensors, flow sensors, and so forth) disposed throughout the gas turbine system. Such sensors may provide the industrial monitoring system data related to parameters associated with the gas turbine system.

In this manner, condition monitoring systems may provide users with valuable information regarding the health or condition of various machines in an industrial environment. For instance, condition monitoring systems may receive inputs from a broad range of sources in a plant including permanent and portable condition monitoring hardware/software, process control and automation hardware/software, process historians, maintenance management and reliability software, spreadsheets, operator logs, and the like. Using the data received from these sources, users of the condition monitoring systems may analyze the data with various tools provided by the condition monitoring systems. However, due to a decreasing availability of technically inclined personnel in the general workforce of the industrial industry, it is now recognized that improved systems and methods for operating condition monitoring systems via a graphical user interface are desired.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system may include a processor that receives data from one or more measurement points associated with a device or one or more components within the device, such that the device may operate in an industrial environment. The system may also include a graphical user interface (GUI) that may display one or more selectable components that correspond to one or more types of the data. The GUI may also receive a selection of one of the selectable components, such that the one of the selectable components corresponds to at least a portion of the data. After receiving the selection, the GUI may receive a grouping mode input that may specify characteristics for display of the at least a portion of the data. The GUI may then display one or more data processing outputs associated with the selection. Each respective data processing output may include one or more visualizations associated with one or more datasets of the at least a portion of the data, such that the respective one or more visualizations of the respective data processing output may be displayed together based on an association between the respective one or more datasets and the grouping mode input.

In a second embodiment, a non-transitory computer-readable medium including machine-readable instructions executable by a processor may cause the processor to display one or more selectable components that correspond to one or more measurement points associated with a device or one or more components within the device. The processor may then receive a selection of one of the selectable components, such that the one of the selectable components corresponds to a subset of the one or more measurement points. The processor may then display a first data processing output for each measurement point of the subset of the measurement points, such that each respective first data processing output may include a respective visualization associated with a respective measurement point of the subset of the measurement points. The processor may then receive a grouping mode input that may specify characteristics for display of one or more visualizations associated with the subset of the measurement points that may be displayed together on one or more second data processing outputs. The processor may then display the one or more second data processing outputs, such that one or more respective visualizations of each respective second data processing output may be displayed together based on an association between one or more measurement points of the subset of the measurement points and the grouping mode input.

In a third embodiment, a method may include displaying one or more selectable components that correspond to one or more types of measurement data associated with a device or a component within the device. The method may then include receiving a selection of one of the selectable components, such that the one of the selectable components corresponds to at least a portion of the measurement data. The method may then receive a grouping mode input to specify characteristics for display of the at least a portion of the data as may be displayed in one or more data processing outputs. The method may then include displaying the one or more data processing outputs associated with the selection, such that each respective data processing output may include one or more visualizations associated with one or more datasets of the at least a portion of the measurement data. The respective one or more visualizations of the respective data processing output may be displayed together based on an association between the respective one or more datasets and the grouping mode input.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
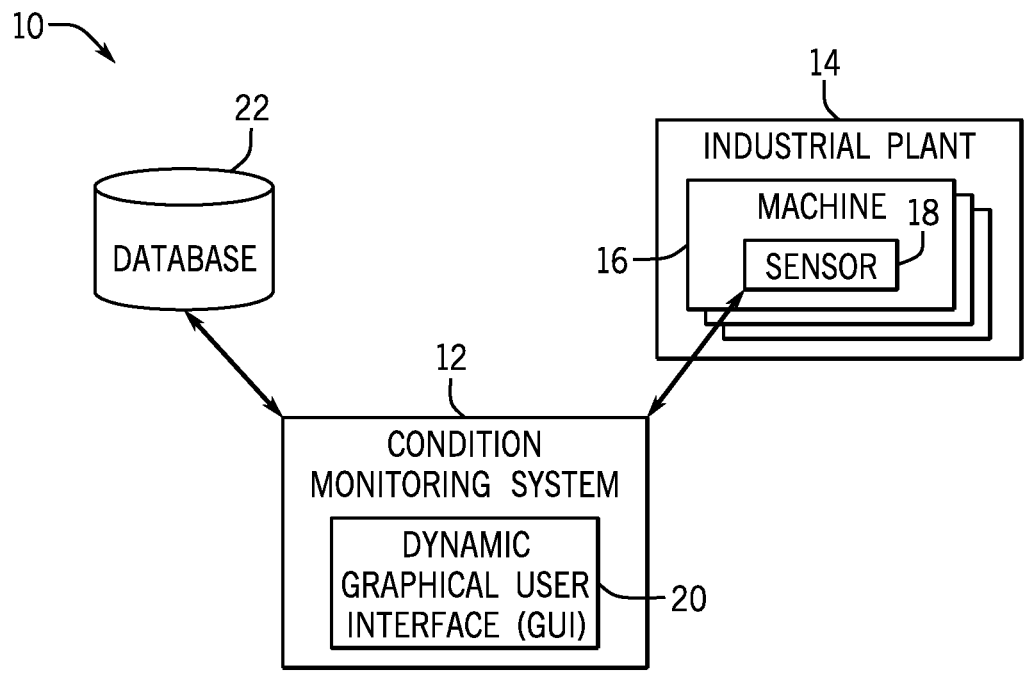
FIG. 1 illustrates a block diagram of an industrial monitoring system, in accordance with embodiments presented herein.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In an industrial environment, a number of machines may be operating together to perform various tasks related to gasifying a feedstock to produce syngas and/or chemicals, generating power for distribution on a power grid, operating turbine systems, mass producing a product, processing certain chemicals, and the like. Generally, each of the machines in the industrial environment may include a number of sensors attached thereto to monitor various conditions within a respective machine. For example, a plurality of sensors may be distributed in a gasification system, a turbine system, and/or a power plant to monitor temperatures, pressures, flow rates, gas compositions, vibration, clearance, torque, rotational speed, exhaust emissions, power output, flame characteristics, combustion dynamics, current, voltage, or any combination thereof. By further example, in a turbine or a motor, one sensor may measure a rotational speed of a shaft, while another sensor may measure an internal temperature. In any case, the data received by these sensors may be provided as inputs into a condition monitoring system. The condition monitoring system may, in turn, present the received data on a display in a coherent and comprehensible manner. The received data may also be processed or analyzed by the condition monitoring system using various types of data processing or analysis tools or the like. As such, if the condition monitoring system processes the received data, the condition monitoring system may present the processed data in a manner that may be further interpreted or analyzed by a user. Additionally or alternatively, the received data may be processed or analyzed using a separate analysis product, which may communicate its results to the condition monitoring system.

In certain embodiments, the condition monitoring system may include a graphical user interface (GUI) that may present visualizations that represent the machines (e.g., turbomachines such as turbines, steam turbines, compressors, or pumps) being monitored by the condition monitoring system. In addition to the visualizations, the condition monitoring system may present the data received by the sensors associated with the monitored machines via the GUI. The condition monitoring system may also perform certain types of data processing or analysis functions such as plotting trend graphs, plotting statistical spectrum graphs, plotting historical charts, and the like, which may then be displayed via the GUI. In one embodiment, the raw data or the processed data associated with each independent sensor may be displayed via the GUI in a respective independent data analysis workspace on the GUI. However, in other embodiments, the GUI may receive an input requesting that the raw data or the processed data associated with each independent sensor be grouped together on a respective data analysis workspace based on properties shared by each sensor. That is, the GUI may group the raw data or the processed data associated with sensors that may be part of a particular hierarchical level of the industrial environment, the sensors that may be monitoring a similar type of component, or the like. Additional details with regard to how the GUI may dynamically group various types of data received or processed by the condition monitoring system will be described below with reference to FIGS. 1-10.

By way of introduction, FIG. 1 illustrates a block diagram of an industrial monitoring system 10 in which various types of machines used for industrial processes may be monitored. The industrial monitoring system 10 may include a condition monitoring system 12, which may receive data from various components (e.g., machines) that may be part of an industrial environment. For example, the condition monitoring system may monitor components used in a plant 14. The plant 14 may include any type of industrial environment where different components or machines may be used to complete one or more industrial processes. As such, the plant 14 may correspond to an oil refinery, a manufacturing facility, a turbomachine system, a power generation system, a gasification system, a chemical production system, a gas turbine system, a steam turbine system, a combined cycle system, a power plant, or the like.

The components in the plant 14 may include one or more machines 16, such as a gasifier, a gas treatment unit, an electric motor, a combustion engine, a gas turbine, a heat exchanger, centrifugal pumps, centrifugal compressors, fans, reciprocating compressors, generators, steam turbines, wind turbines, piping, axial compressors, screw compressors, gears, turbo-expanders, blowers, agitators, mixers, pulp refiners, ball mills, crushers, pulverizers, extruders, pelletizers, cooling towers, boilers, furnaces, heat recovery steam generators (HRSGs), and the like. Each machine 16 may include one or more sensors 18 that may monitor various aspects of a respective machine 16. The sensors 18 may include temperature sensors, current sensors, voltage sensors, pressure sensors, displacement sensors, vibration sensors, velocity sensors, acceleration sensors, flow sensors, clearance sensors, flame sensors, gas composition sensors, vibration sensors, clearance sensors, gas composition sensors, speed sensors, emissions sensors, and any other type of sensor that may provide information with respect to the operation of the respective machine 16.

Generally, the data acquired by the sensors 18 may be received by the condition monitoring system 12 via a direct link (i.e., hardwired), a network link, or a portable memory device (e.g., Universal Serial Bus memory drive). In one embodiment, the condition monitoring system 12 may include a dynamic graphical user interface (GUI) 20 that may generate visualizations that represent the machines 16 and the sensors 18 being monitored by the condition monitoring system 12. As such, users of the condition monitoring system 12 may monitor the health or status of machines 16 in the plant 14 via the dynamic GUI 20. Further, the condition monitoring system 12 may be used to measure one or more mechanical devices of larger mechanical systems (e.g., steam turbine systems, hydraulic turbine systems, wind turbine systems, reactors, gasifiers, gas treatment systems, industrial automation systems, or other suitable mechanical systems).

The dynamic GUI 20 may enable the user to perform various types of data processing or analysis using tools provided by the condition monitoring system 12 or by separate data processing or analysis products. For instance, the user may generate a graph plotting a statistical trend of the data received from a particular sensor 18 over time. In one embodiment, after the statistical trend graph has been generated, the user may dynamically control the data being analyzed by the tool by selecting a different sensor 18 visualization displayed in the dynamic GUI 20.

In addition to data acquired by the sensors 18, the condition monitoring system 12 may receive data from a database 22 which may be stored within the condition monitoring system 12, in a server, in a cloud-computing device, or the like. The database 22 may include historical data related to the data acquired by the sensors 18, calculated data associated with a machine 16 or sensor 18, results from previous data processing or analysis functions performed on data associated with a machine 16 or sensor 18, or other contextual data related to the plant 14. For example, the database 22 may include data related to the historical operating conditions (e.g., when operating at full capacity) of the plant 14 such as a plant historian or the like.

Although FIG. 1 has been described with respect to an industrial environment, it should be noted that the systems and techniques described herein may be applied to other systems outside of the industrial environment. As such, the systems and techniques described herein should not be limited to industrial environments and the like.

Figure 2:
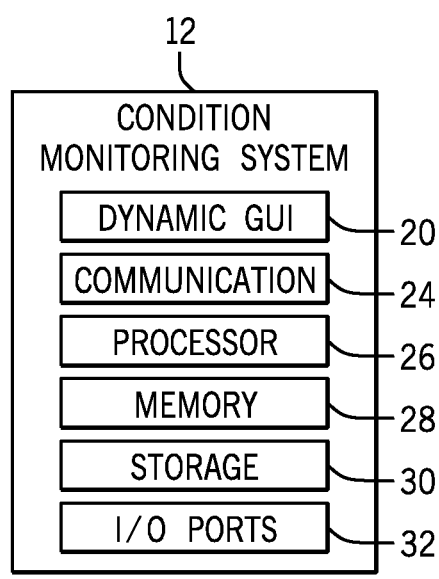
FIG. 2 illustrates a block diagram of a condition monitoring system that may be employed in the industrial monitoring system of FIG. 1, in accordance with embodiments presented herein.

In addition to the dynamic GUI 20, the condition monitoring system 12 may include various other components to display data, processing or analysis of data, and the like via the dynamic GUI 20. FIG. 2 illustrates a block diagram of some example components that may be part of the condition monitoring system 12. As shown in the figure, the condition monitoring system 12 may include a dynamic GUI 20, a communication component 24, a processor 26, a memory 28, a storage 30, input/output (I/O) ports 32, and the like. The communication component 24 may be a wireless or wired communication component that may facilitate communication between the condition monitoring system 12, the machines 16, the sensors 18, the database 22, other control or monitoring systems, and the like. The processor 26 may be any type of computer processor or microprocessor capable of executing computer-executable code. The memory 28 and the storage 30 may be any suitable articles of manufacture that can serve as media to store processor-executable code, data, or the like. These articles of manufacture may represent non-transitory computer-readable media (i.e., any suitable form of memory or storage) that may store the processor-executable code used by the processor 26 to, among other things, analyze data and dynamically link analyzed data with visualizations displayed and selected via the dynamic GUI 20. The non-transitory computer-readable media merely indicates that the media is tangible and not a signal.

The dynamic GUI 20 may include any type of display device including a touch screen display device that may receive user inputs via the display device itself. In certain embodiments, the dynamic GUI 20 may interact with the communication component 24, the processor 26, the memory 28, the storage 30, and the input/output (I/O) ports 32 to dynamically update or control visualizations displayed on the dynamic GUI 20. The dynamic GUI 20 may be disposed on any type of computing device including an industrial monitor, a workstation, a portable monitoring device, a smart phone device, or another suitable device.

Figure 3:
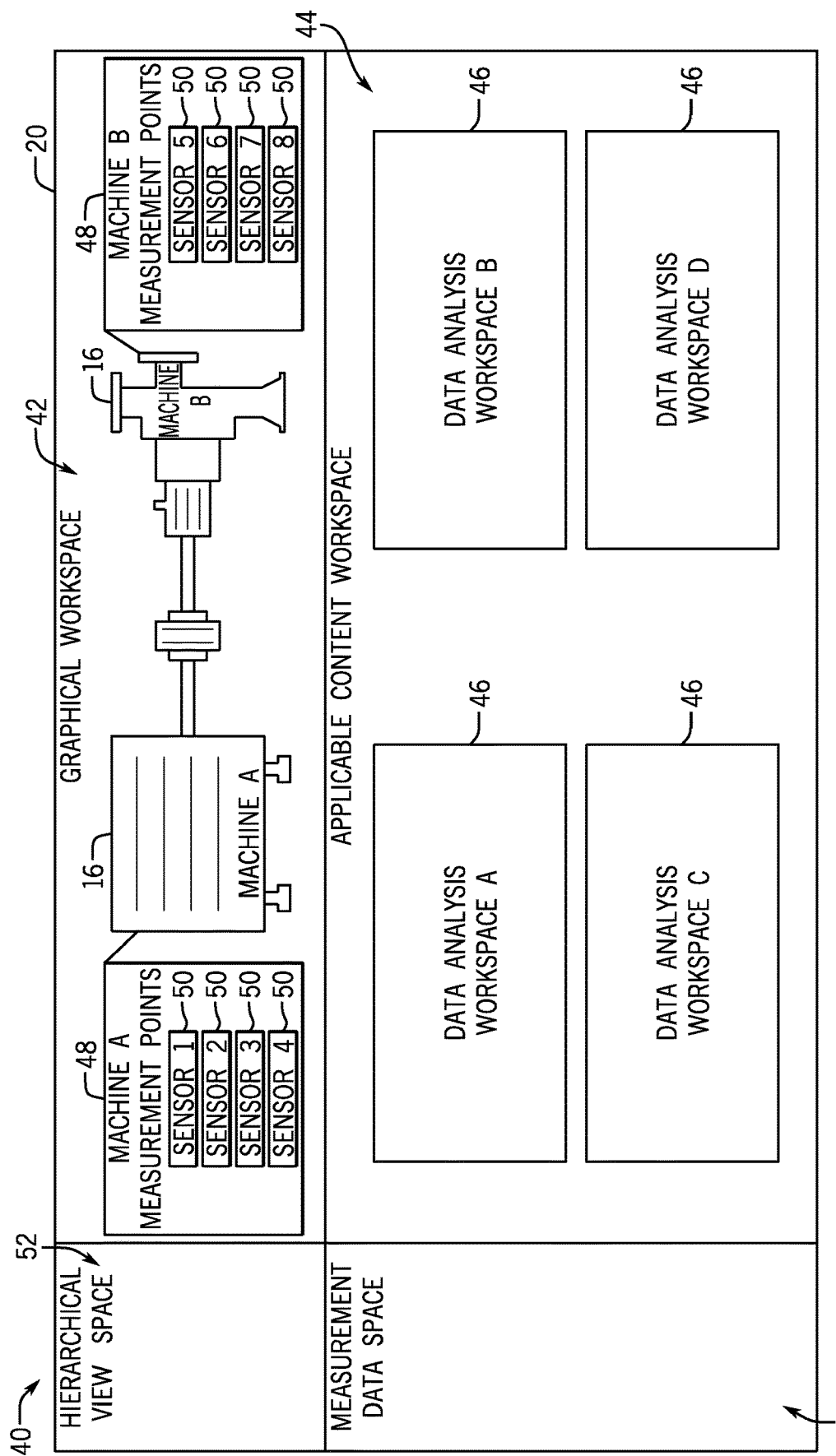
FIG. 3 illustrates a schematic view of graphics displayed on a graphical user interface for the condition monitoring system of FIG. 2, in accordance with embodiments presented herein.

Keeping the foregoing in mind, FIG. 3 illustrates an example view 40 of graphics that may be displayed by the processor 26 via the dynamic GUI 20. Referring to FIG. 3, the dynamic GUI 20 may include a graphical workspace 42 and an applicable content workspace 44. The graphical workspace 42 may include visualizations that represent the machines 16 or a subset of the machines 16 being monitored by the condition monitoring system 12. The machines 16 may be depicted in the graphical workspace 42 as a machine train diagram. The machine train diagram may illustrate how a number of machines 16 may be coupled to each other. The visualizations representing the machines 16 may be selectable components that may be interacted with by a user of the condition monitoring system 12 via the dynamic GUI 20. In one embodiment, a user of the dynamic GUI 20 may select a visualization depicted in the graphical workspace 42, and the dynamic GUI 20 may then dynamically update various processing or analysis tools currently being displayed in the applicable content workspace 44 based on data that corresponds to the machine 16 associated with the selected visualization.

The applicable content workspace 44 may include a number of data analysis workspaces 46. Each data analysis workspace 46 may include results or outputs of various data processing or analysis tools provided by the condition monitoring system 12. The data processing or analysis tools may generate plots that illustrate various trends in the acquired data, spectrum information related to the acquired data, the historical values of the acquired data, the changes in the data over time, and the like. Some additional data processing or analysis outputs may include a waveform plot, a spectrum plot, an orbit plot, a bode plot, compressor performance curves, pump performance curves, histograms, bar graphs, shaft centerline plots, circular plots, waterfall plots, and the like. As such, after selecting a visualization in the graphical workspace 42, the user of the dynamic GUI 20 may send a request to the condition monitoring system 12 to perform some type of data processing or analysis function on the data associated with the machine 16 or sensor 18 that corresponds to the selected visualization. The dynamic GUI 20 may then display the results or outputs of the data processing or analysis in the data analysis workspace 46.

In addition to providing results of data processing or analysis, the applicable content workspace may also provide additional information related to alarm events, statuses, reference materials, and the like regarding a machine 16 or sensor 18 associated with a selected visualization in the graphical workspace 42. The additional information may include various reports, original equipment manufacturer datasheets, work history, and the like.

Referring back to the graphical workspace 42, the graphical workspace 42 may also include a data field 48 that may display data entries 50 associated with a respective machine 16. The data entries 50 may include real-time measurement data received from various sensors 18 disposed on a respective machine 16, data calculated by the processor 26, or the like. The data entries 50 may also include an alarm status or event status indication. For example, each data entry 50 may be shaded with a particular color or associated with a particular color to indicate to the user a specific alarm status. In one embodiment, each data entry 50 may be individually selectable like the visualizations of the machines 16, such that additional information regarding the selected data entry 50 may be presented in the applicable content workspace upon selection.

When a particular data entry 50 has been selected in the graphical workspace 42, the dynamic GUI 20 may dynamically update a hierarchical view space 52 to indicate that the respective data entry 50 has been selected. The hierarchical view space 52 may display a hierarchical structure of the machine train diagram depicted in the graphical workspace 42. That is, the hierarchical structure may list the components depicted in the graphical workspace 42 based on its hierarchical relationship to other components in the graphical workspace 42. For example, Machine A and Machine B may be listed underneath an enterprise that represents the entire machine train diagram depicted in the graphical workspace 42. Under each machine, the data entries 50 for each respective machine may be listed as one hierarchical step removed from the respective machine.

Keeping this in mind, when a particular data entry 50 has been selected in the graphical workspace 42, the dynamic GUI 20 may dynamically highlight the corresponding component listed in the hierarchical view space 52. In this manner, the dynamic GUI 20 may dynamically update different parts of the dynamic GUI 20 after a user makes a single selection elsewhere in the dynamic GUI 20. In the same fashion, when a particular data entry 50 has been selected in the hierarchical view space 52, the dynamic GUI 20 may dynamically highlight or select the corresponding component listed in the graphical workspace 42.

The dynamic GUI 20 may also include a measurement data space 54. The measurement data space 54 may include all measurement types that may have been collected for a component selected in the hierarchical view space 52 or the graphical workspace 42. As such, the measurement data space 54 may include a number of visualizations or headers for different categories or types of collected measurements. The measurements may include diagnostic waveforms/spectrums, vectors, scalar variables, and the like. Each type of collected measurement may also be a selectable component dynamically linked with a component displayed in the hierarchical view space 52, the graphical workspace 42, and the applicable content workspace.

In certain embodiments, the components in the graphical workspace 42, the applicable content workspace, the hierarchical view space 52, and the measurement data space 54 may be linked together using software pointers. That is, each selectable component may include one or more pointers that may direct the dynamic GUI 20 to data associated with the selected component, such that the graphical workspace 42, the applicable content workspace, the hierarchical view space 52, and the measurement data space 54 may be updated based on the data associated with the selected component. For example, when a component is selected within the graphical workspace 42, the data presented in the applicable content workspace, the hierarchical view space 52, and the measurement data space 54 may be updated to match the data associated with the selected component. In this manner, each portion of the dynamic GUI 20 may be dynamically updated based on a selection of a component via the dynamic GUI 20.

As mentioned above, the measurement data space 54 may include all measurements that may have been collected for a component selected in the hierarchical view space 52 or the graphical workspace 42. Generally, when the user selects an entry in the measurement data space 54, an individual data analysis workspace 46 may be generated for each individual data source that may be associated with the selected entry. That is, if the user selects an entry in the measurement data space 54 that is associated with a number of measurement points, the GUI 20 may generate an individual data analysis workspace 46 for each individual measurement point. By generating an individual data analysis workspace 46 for each individual measurement point, the GUI 20 groups the data presented in the data analysis workspaces 46 according to measurement points.

Figure 4A:
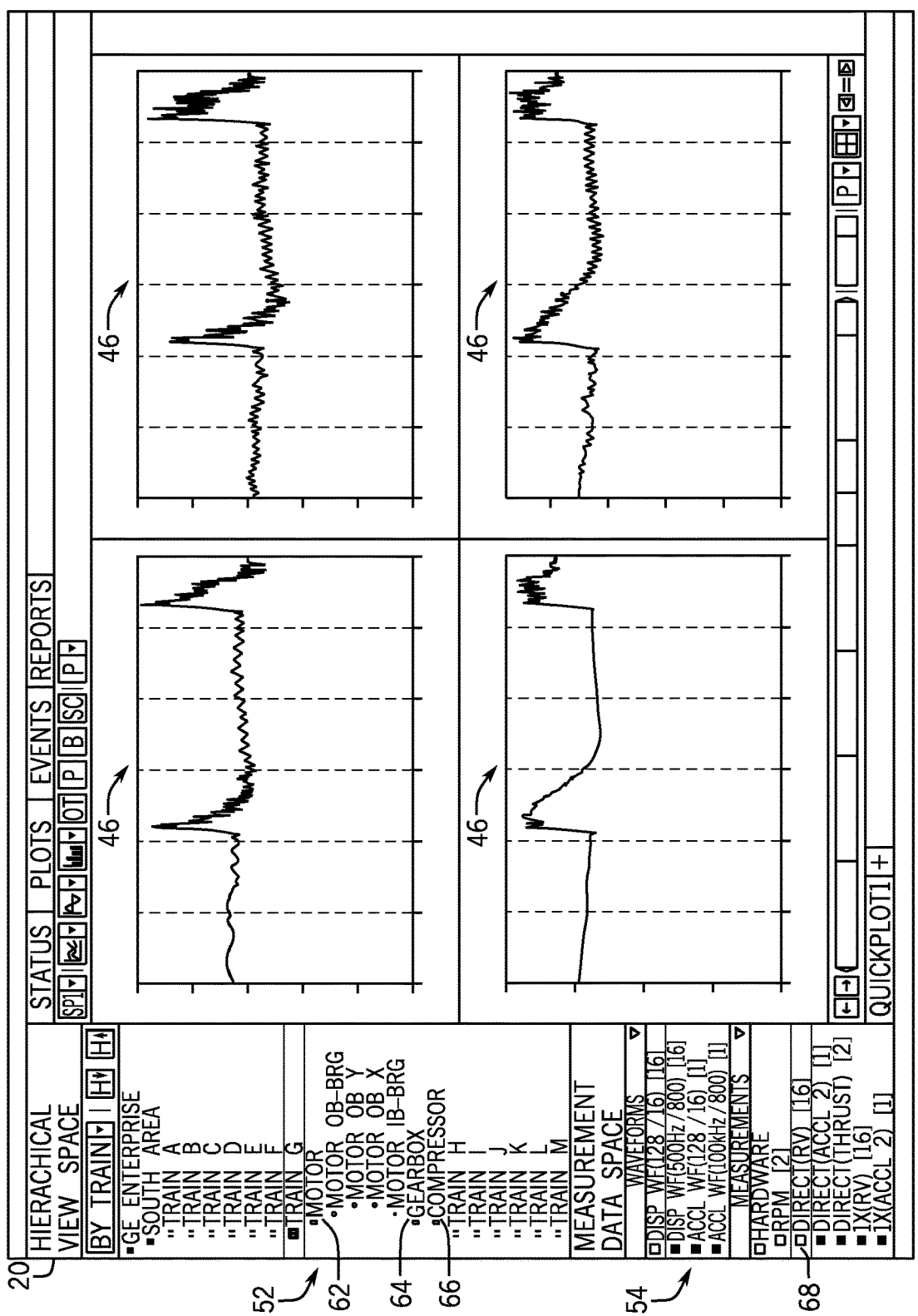
FIGS. 4A-4D illustrate schematic views of a number of plots generated via the graphical user interface for the condition monitoring system of FIG. 2, in accordance with embodiments presented herein.
Figure 4B:
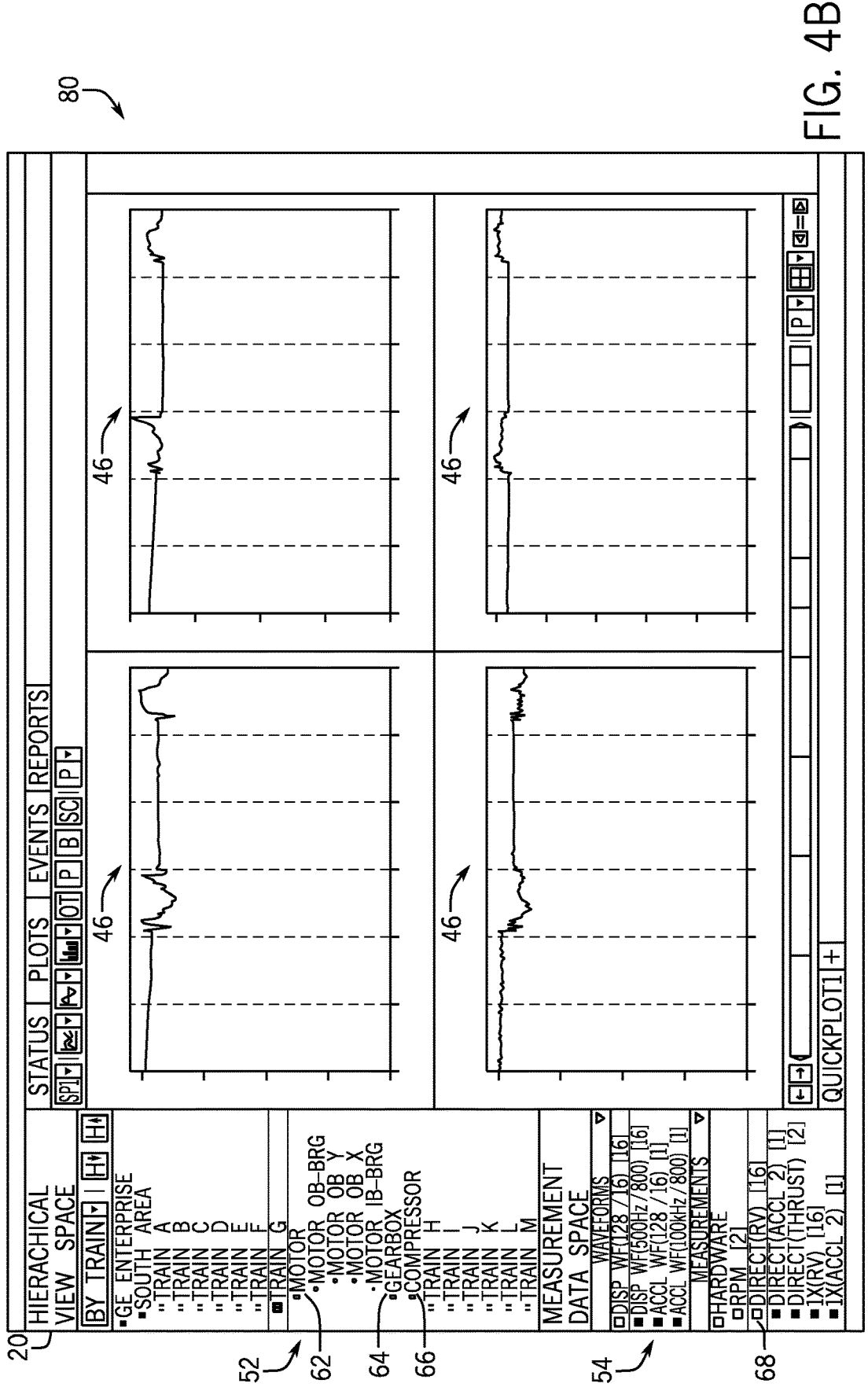
Figure 4C:
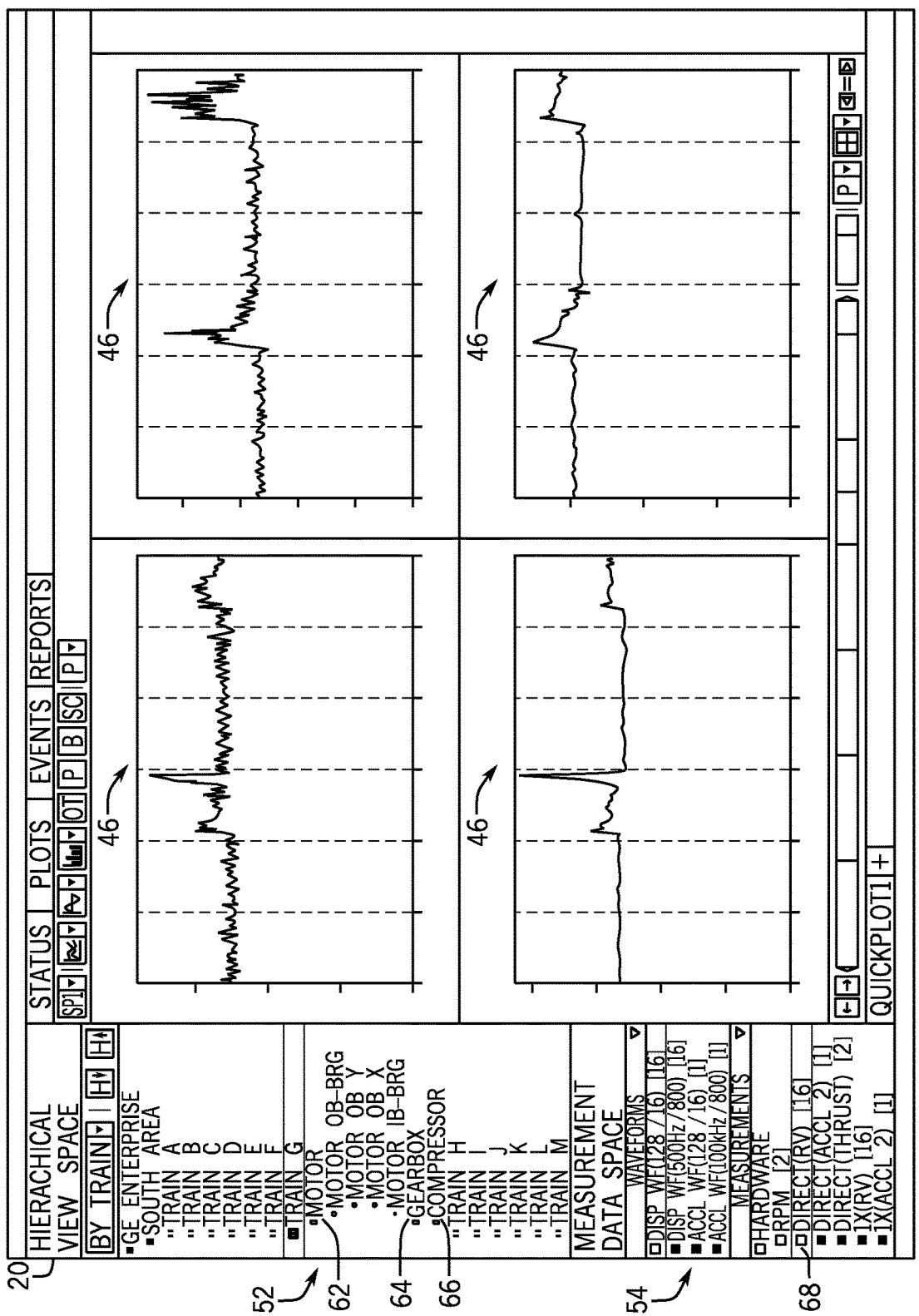
Figure 4D:
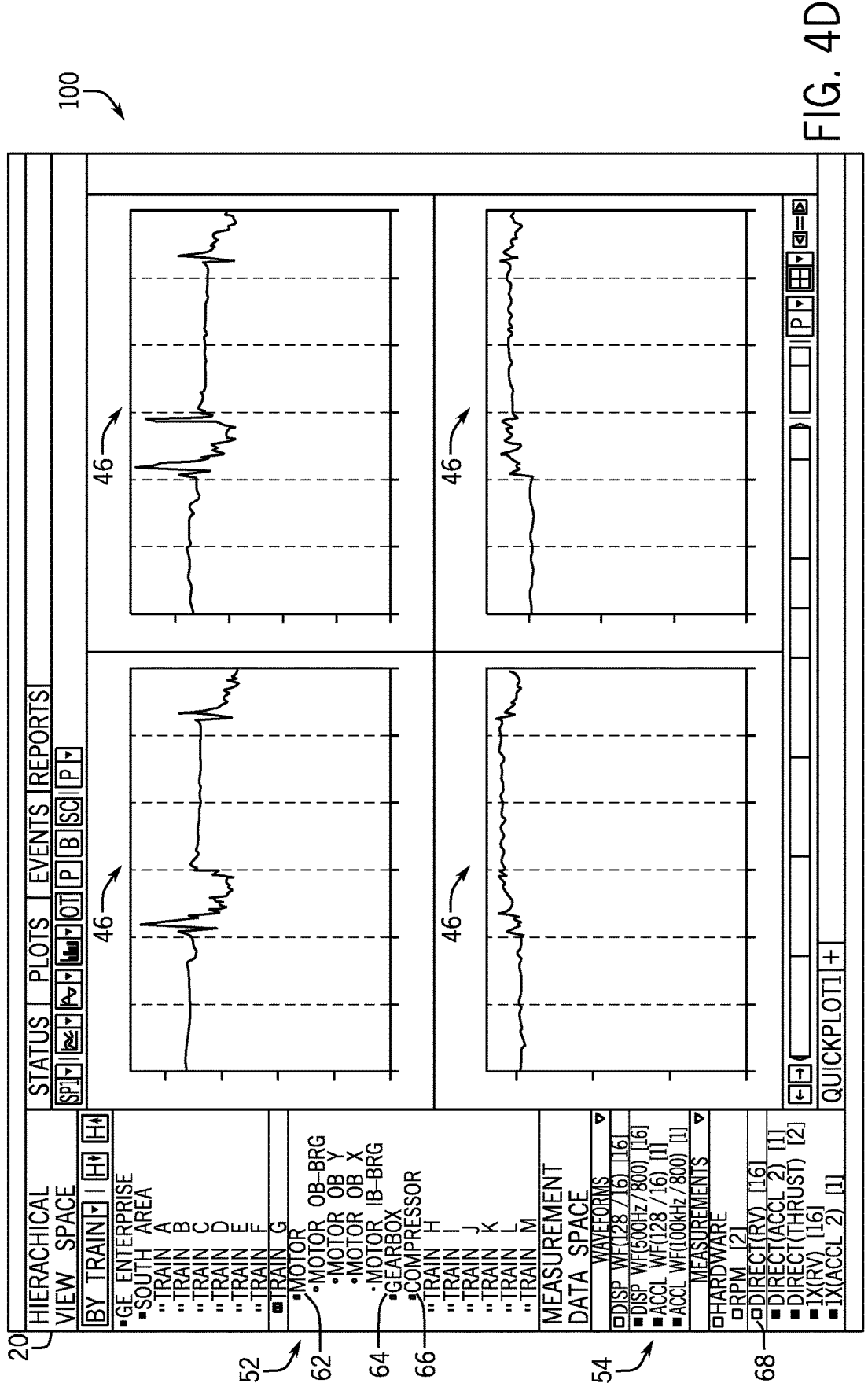

Keeping the foregoing in mind, FIGS. 4A-4D illustrate schematic views 60, 80, 90, 100 of a number of plots generated in corresponding data analysis workspaces 46 via the GUI 20 when an entry in the measurement data space 54 has been selected. Referring first to FIG. 4A, machine train diagram G ("Train G") in the hierarchical view space 52 is indicated as being selected. Here, the machine train diagram G includes a motor 62, a gearbox 64, and a compressor 66. For the purposes of discussion, the motor 62 may include, for example, two bearings: an outboard bearing (OB) and an inboard bearing (IB). Each bearing of the motor 62 may include two data measurement points (i.e., X measurement and Y measurement). As such, the motor 62 may be associated four bearing data measurement points.

In the same manner, the gearbox 64 may, in one example, include four bearings: a low speed inboard bearing, a low speed outboard bearing, a high speed inboard bearing, and a high speed outboard bearing. Each bearing of the gearbox 64 may also include two data measurement points (i.e., X measurement and Y measurement). As such, the gearbox 64 may be associated eight bearing data measurement points.

Similarly, the compressor 66 may, for instance, include two bearings: an inboard bearing and an outboard bearing. Each bearing of the compressor 66 may also include two data measurement points (i.e., X measurement and Y measurement). As such, the compressor 66 may be associated four bearing data measurement points.

In one embodiment, the GUI 20 may receive a selection or input in the measurement data space 54 at a measurement entry associated with a direct RV (radial vibration) data entry 68. The direct RV measurement type 68 may be associated with the sixteen measurement points from the bearings of the motor 62, the gearbox 64, and the compressor 66. As such, in one embodiment, the GUI 20 may generate an individual plot for each of the sixteen measurement points in a respective data analysis workspace 46, as shown in FIGS. 4A-4D.

Referring to FIGS. 4A-4D, the sixteen measurement points associated with the direct RV measurement type 68 may be grouped in each respective data analysis workspace 46 by point. That is, the GUI 20 may generate a plot or some data analysis visualization for each measurement point associated with the direct RV measurement type 68. As such, the GUI 20 may group the data corresponding to the sixteen measurement points received from the bearings of the motor 62, the gearbox 64, and the compressor 66 by its respective measurement point.

Figure 5:
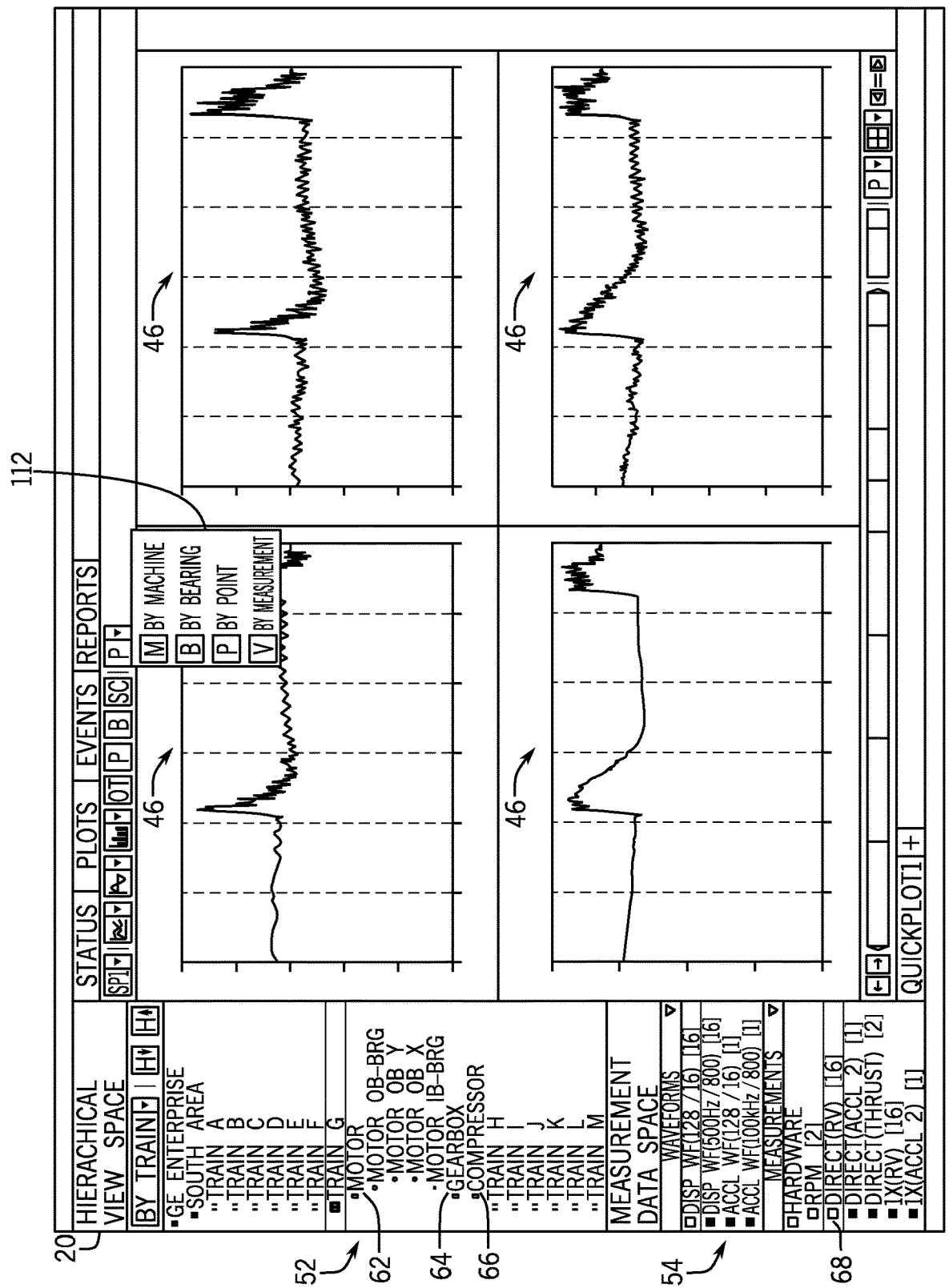
FIG. 5 illustrates a schematic view of a visualization providing an option to group the number of plots of FIGS. 4A-4D, in accordance with embodiments presented herein.

In one embodiment, the GUI 20 may provide a number of options (e.g., grouping modes) in which the data associated with a selected input (e.g., the direct RV measurement type 68) may be grouped. For example, FIG. 5 illustrates a schematic view 110 of a visualization 112 [[['112' missing from FIG. 5]]] for providing a number of options for grouping the data associated with the selected input. As shown in FIG. 5, the visualization 112 may provide that the GUI 20 group the data associated with the selected input by point, by machine, by bearing, by measurement type, and the like.

As illustrated in FIGS. 4A-4D, when grouping the data by point, the GUI 20 may group the data associated with each measurement point to a single data analysis workspace 46. As such, when the selected input (e.g., the direct RV measurement type 68) is associated with the sixteen measurement points, the GUI 20 may group the data associated with each respective measurement point on a single data analysis workspace 46.

When grouping the data by machine, the GUI 20 may group all of the measurement points associated with a particular machine onto a single data analysis workspace 46. That is, the GUI 20 may analyze all of the data associated with selected measurement points for each machine 16, and display the analyzed data for each machine 16 in a single data workspace 46. For example, the GUI 20 may display the analyzed data for each machine 16 in a stacked or overlaid plot type, such that data associated with a measurement point from the respective machine 16 may be depicted in the same data analysis workspace 46. In other words, when the GUI 20 displays the analyzed data for each machine 16, the GUI 20 may display the measurement points associated with the selected input for the corresponding machine 16 that may include the measure points that correspond to, for example, a motor, compressor, pump, generator, gas turbine engine, steam turbine, hydro turbine, wind turbine, gasifier, gas treatment system, heat recovery steam generator, or the like.

Figure 6A:
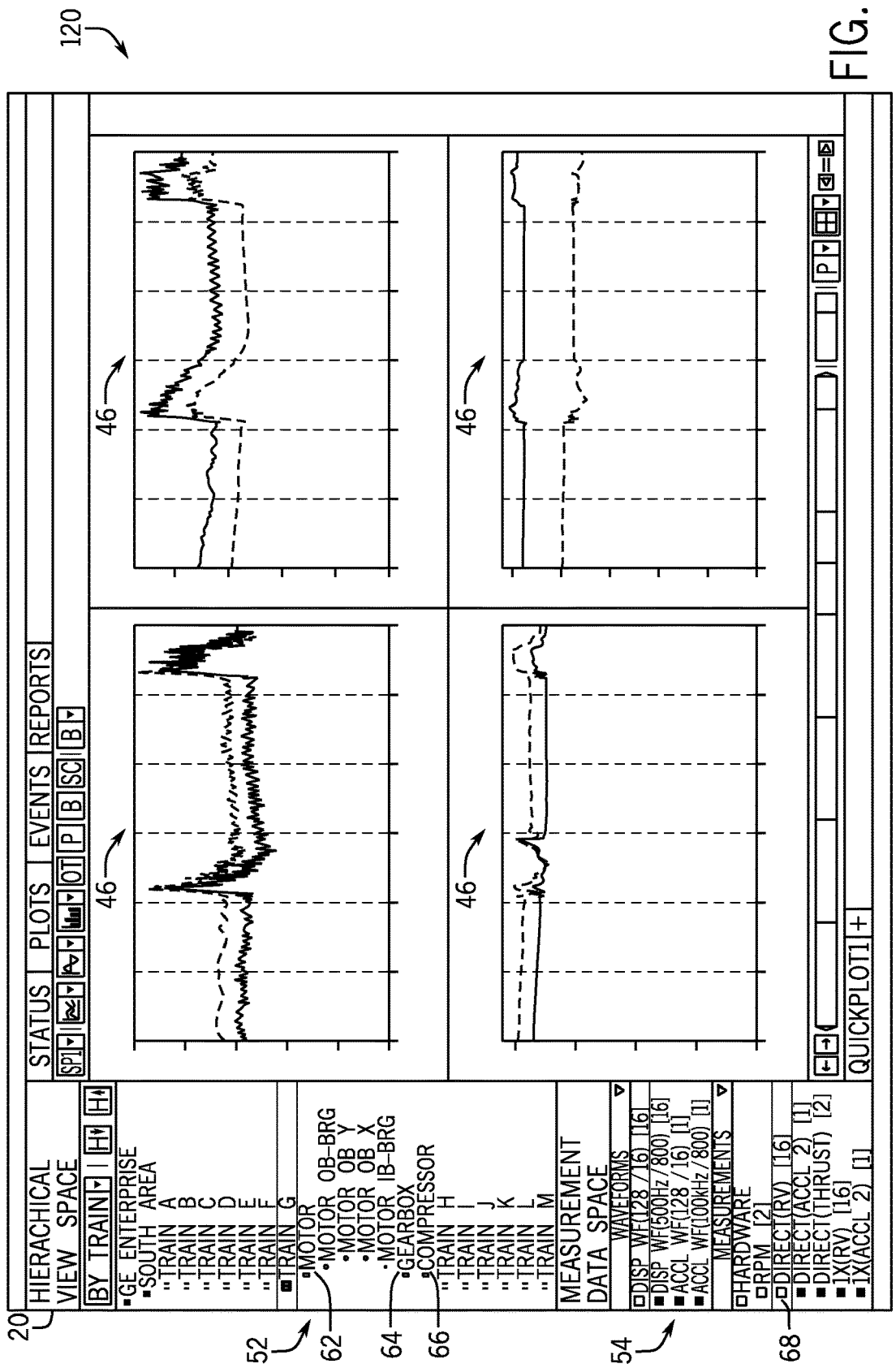
FIGS. 6A-6B illustrate schematic views of example groupings of the number of plots of FIGS. 4A-4D, in accordance with embodiments presented herein.
Figure 6B:
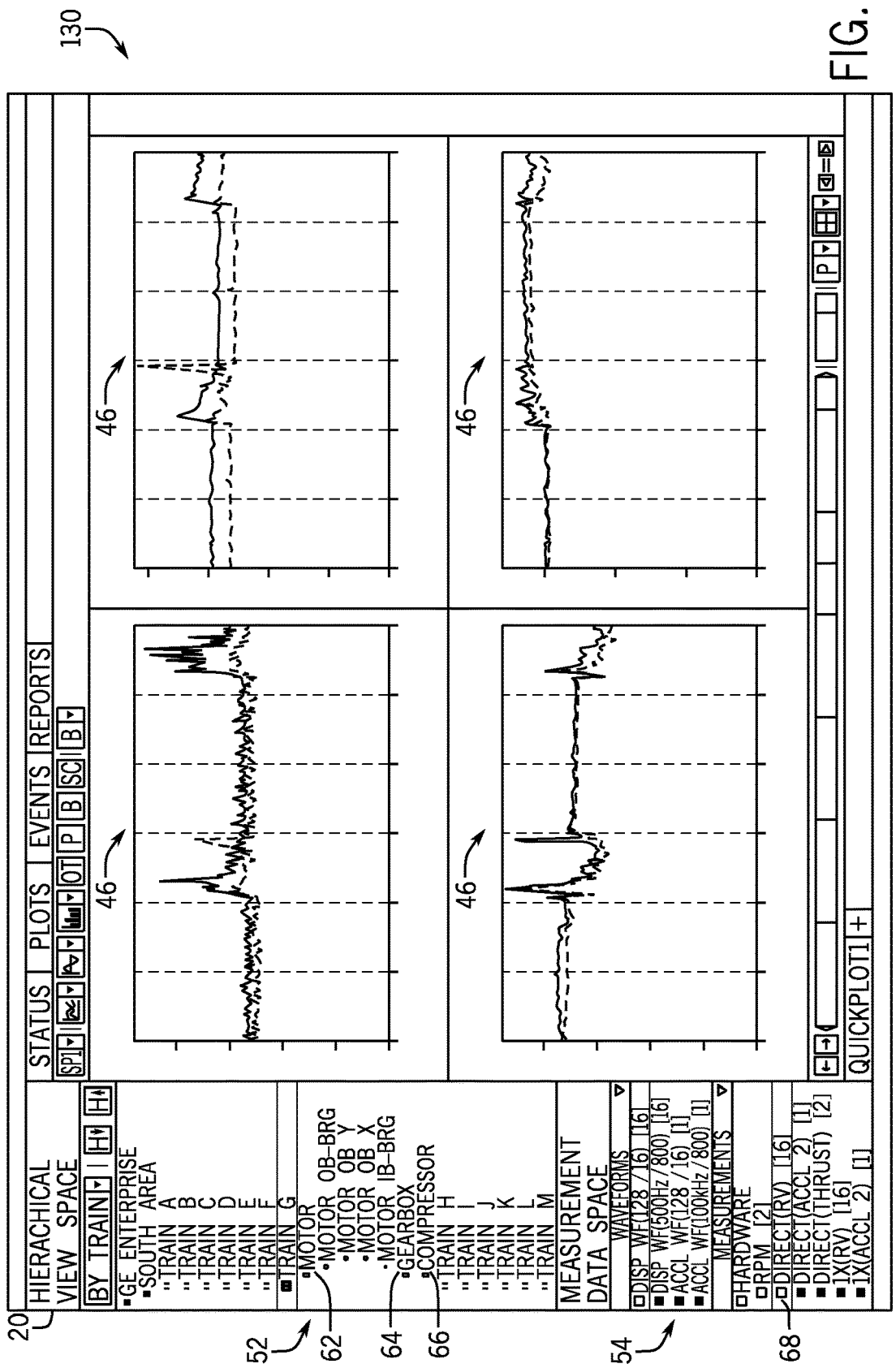

When grouping the data by bearing, the GUI 20 may group all of the measurement points associated with a particular bearing on a single data analysis workspace 46. For example, FIGS. 6A and 6B illustrate schematic views 120 and 130 of the sixteen measurement points associated with the direct RV measurement type 68 grouped according to a respective bearing. That is, the sixteen measurement points associated with the direct RV measurement type 68 may include two measurement points for each of eight bearings that may be in the motor 62, the gearbox 64, and the compressor 66. As such, the GUI 20 may include the data analysis (e.g., plots) associated with the measurement points for each bearing on a single data analysis workspace 46. As a result, each of the eight data analysis workspaces 46 depicted in FIGS. 6A and 6B include two plot curves—one for each measurement point associated with a respective bearing. In addition to grouping the data by bearings, in certain embodiments, the GUI 20 may group measurement points according to a subcomponent of the machine 16. For example, a compressor machine may include subcomponents such as a combustor, a fuel nozzle, a turbine, and the like. As such, the GUI 20 may provide options to the user to group the data associated with the compressor by its association with the combustor, the fuel nozzle, the turbine, and the like.

Referring back to FIG. 5, the visualization 112 may also provide an option to group all of the measurement points associated with a selected input by measurement type. That is, all of the measurement points associated with a particular measurement selection may be added to a single data analysis workspace 46. For example, the GUI 20 may display the analyzed data for each measurement type selected in the measurement data space 54 in a stacked or overlaid plot type, such that data associated with each measurement type may be depicted in the same data analysis workspace 46.

Figure 7:
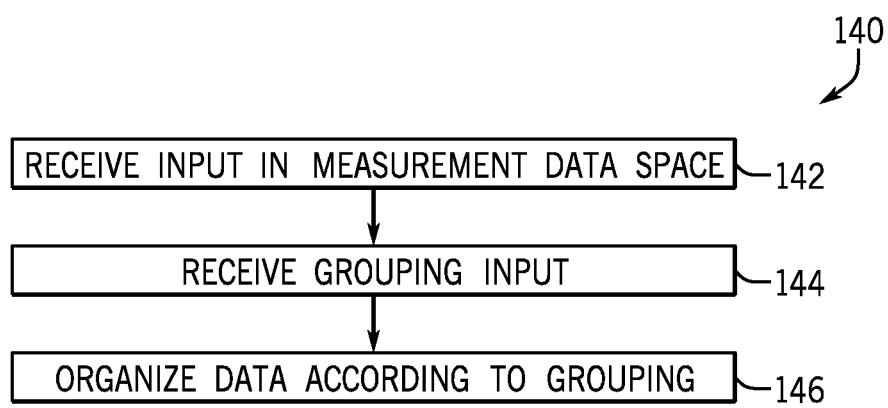
FIG. 7 illustrates a flow chart of a method for organizing data according to a grouping associated with the industrial monitoring system of FIG. 1, in accordance with embodiments presented herein.
Figure 8A:
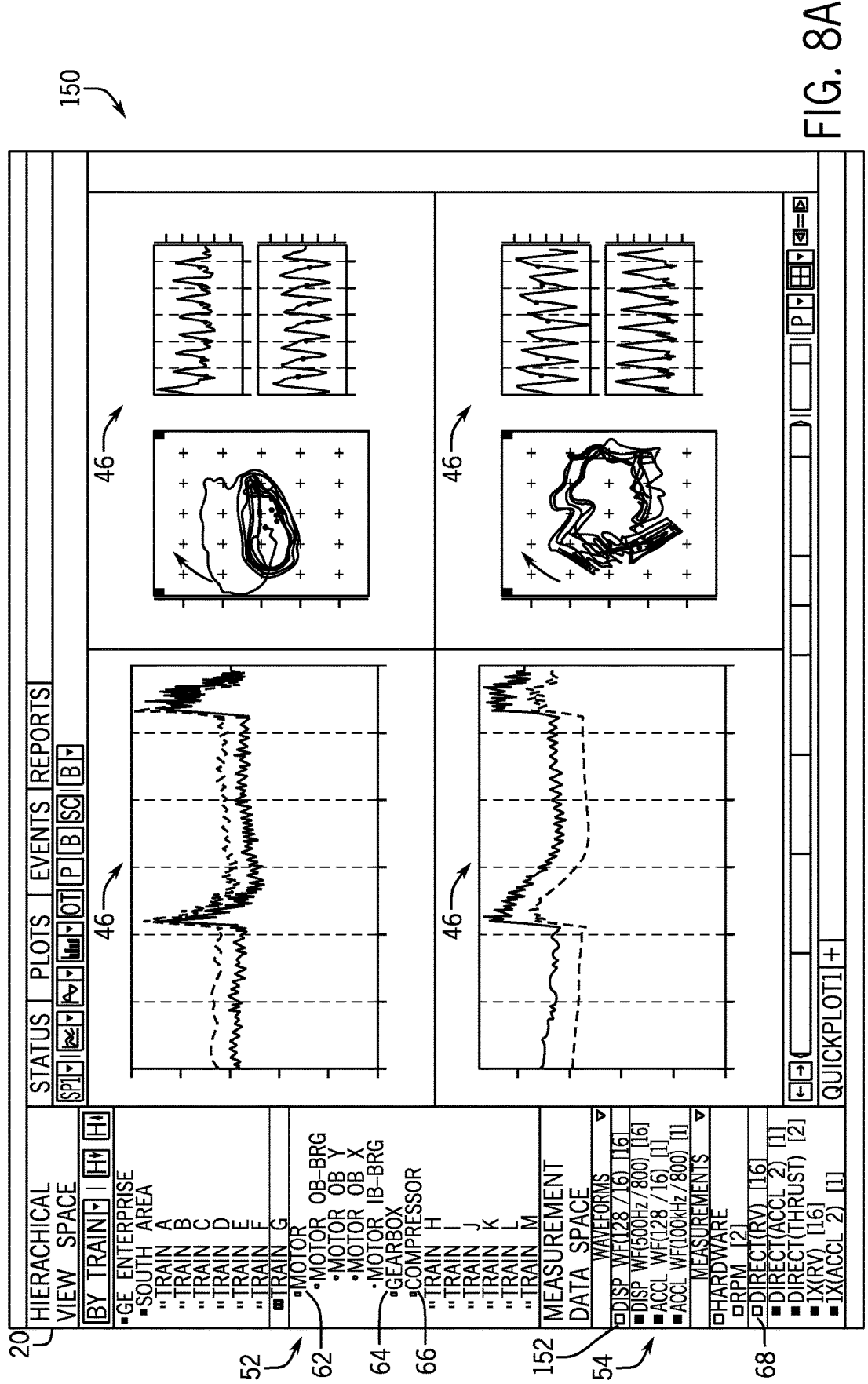
FIGS. 8A-8D illustrate schematic views of the plots of FIGS. 4A-4D along with additional plots depicted according to a first order mode, in accordance with embodiments presented herein.
Figure 8B:
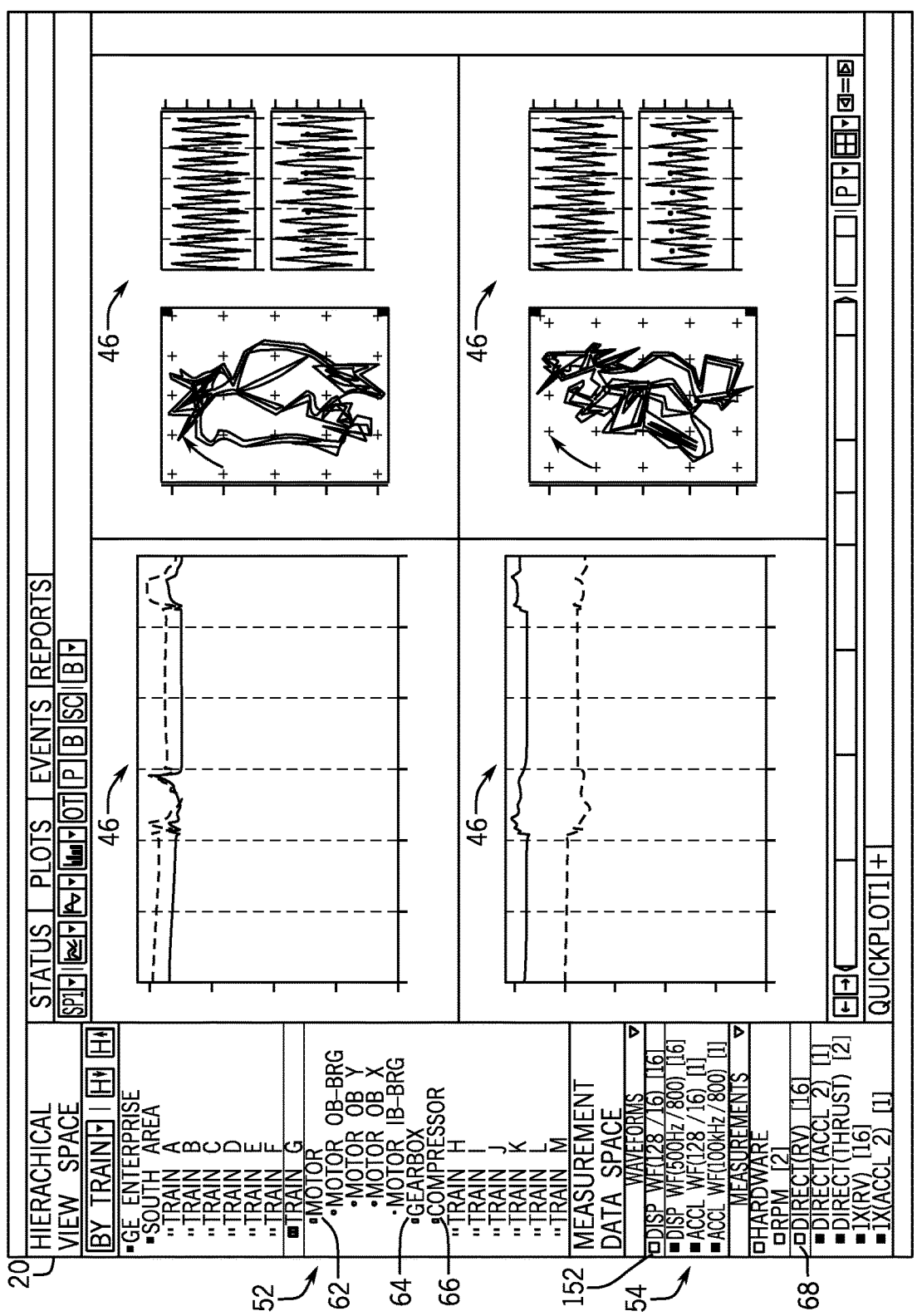
Figure 8C:
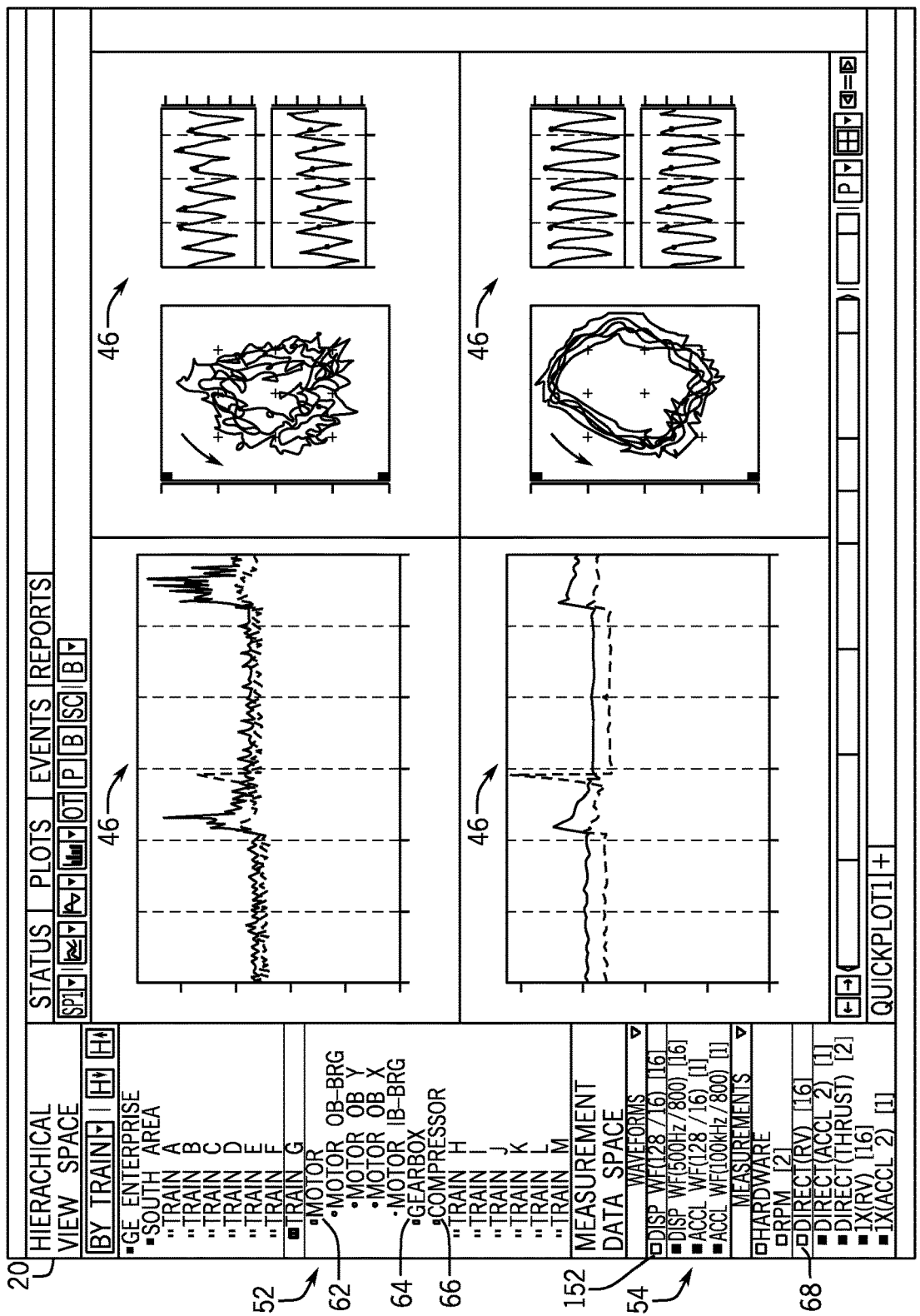
Figure 8D:
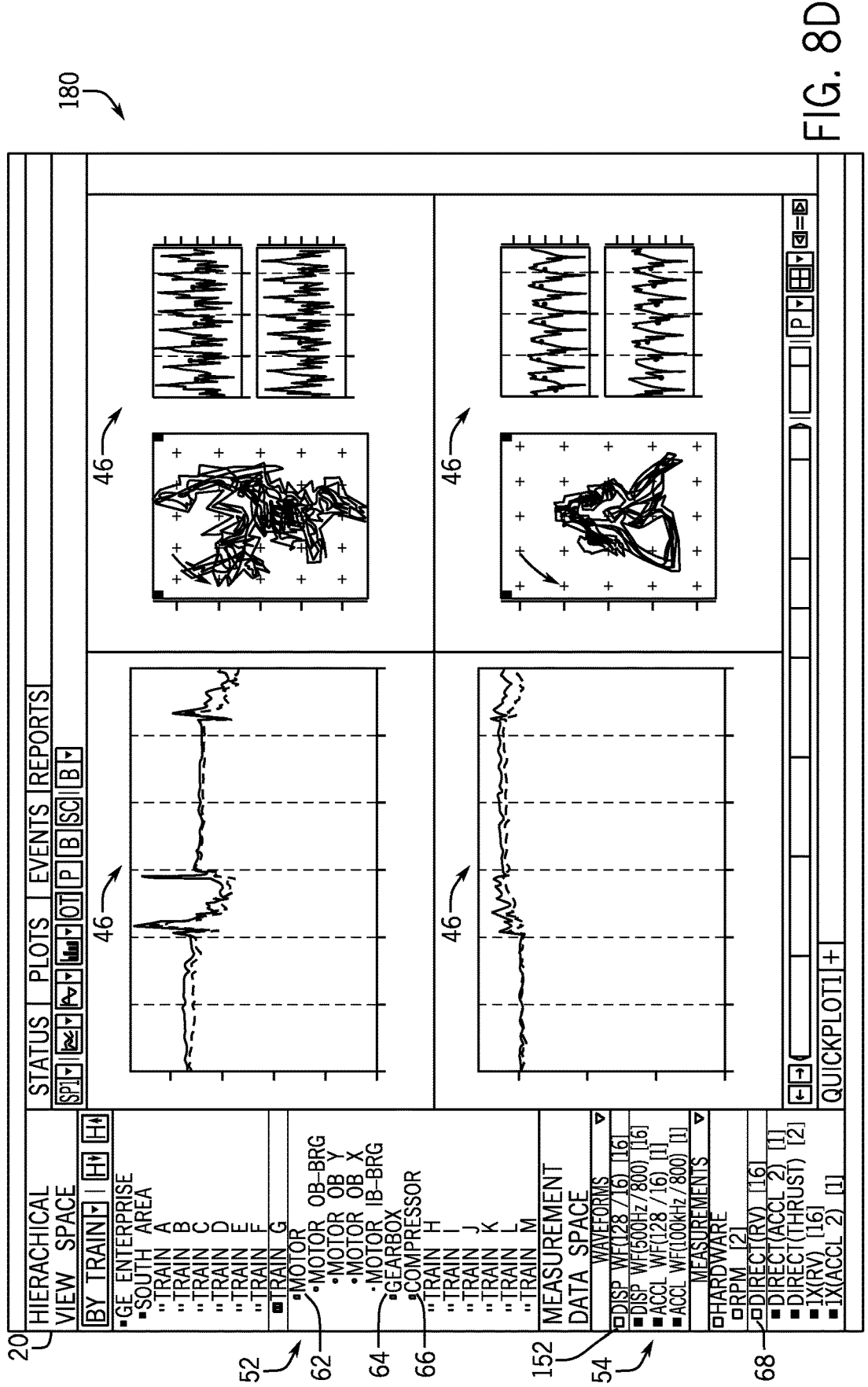

Keeping the foregoing in mind, FIG. 7 illustrates a flowchart of a method 140 for organizing data according to a grouping selected by a user of the GUI 20. In certain embodiments the method 140 may be performed by the GUI 20, the processor 26, or the like.

As shown in FIG. 7, at block 142, the GUI 20 may receive an input in the measurement data space 54. As mentioned above, the measurement data space 54 may include all measurement data that may have been collected for a component selected in the hierarchical view space 52. As such, if the component selected in the hierarchical view space 52 includes subcomponents, all of the measurement data collected for each subcomponent of the selected component may be grouped together as a particular measurement field in the measurement data space 54.

For instance, referring briefly to FIG. 5, the machine train diagram G may be selected in the hierarchical view space 52 and the direct RV measurement type 68 may be selected, as the input received at block 142, in the measurement data space 54. As such, the direct RV measurement type 68 may include all of the measurement data associated with the direct RV data for the machine train diagram G, which may include the motor 62, the gearbox 64, the compressor 66, and the respective components and subcomponents that correspond to the motor 62, the gearbox 64, and the compressor 66.

After receiving the input at block 142, at block 144, the GUI 20 may receive an input indicating a type of grouping to group the measurement data associated with the selected input. In one embodiment, the GUI 20 may receive an input via the visualization 112 providing that the GUI 20 groups the measurement data associated with the selected input by machine, bearing, point, or measurement type.

At block 146, the GUI 20 may organize the measurement data that corresponds to the selected input at block 142 according to the grouping input received at block 144. As such, the GUI 20 may group the measurement data that corresponds to the selected input at block 142, such that each data analysis workspace 46 may include the respective measurement data for each respective machine, respective bearing, respective point, or respective measurement type, which may have been specified at block 144.

In addition to grouping measurement data according to the selected input, the GUI 20 may also provide an option for users to dynamically present the data analysis workspaces 46 according to a certain order. Keeping this in mind and referring briefly back to FIGS. 6A-6B, the eight data analysis workspaces 46 depicted in FIGS. 6A and 6B may be initially ordered according to a measurement point ordering mode, which may have been selected by the user. That is, each of the measurement points associated with the eight data analysis workspaces 46 depicted in FIGS. 6A and 6B may be displayed according to some order. In one embodiment, the order may be associated with a hierarchical structure depicted in the hierarchical view space 52. As such, each measurement point may be associated with some order value, and the GUI 20 may display each of the eight data analysis workspaces 46 according to the respective order values of the measurement points depicted in each of the eight data analysis workspaces 46.

In certain embodiments, as additional data analysis workspaces 46 are generated, the GUI 20 may continue to display the newly generated data analysis workspaces 46 according the order of the measurement values. For instance, FIGS. 8A-8D depict schematic views 150, 160, 170, and 180 that include the eight data analysis workspaces 46 of FIGS. 6A and 6B along with additional data analysis workspaces 46 generated based on a user input. In particular, FIGS. 8A-8D include trend plots as depicted in FIGS. 6A and 6B and orbit-timebase plots associated with the Disp Wf (displacement waveform) measurement type 152, which may have been selected by the user. Here, each orbit-timebase plot depicts data associated with two measurement points that correspond to the immediately preceding trend plot. As such, each data analysis workspace 46 may be organized or ordered with respect to the measurement points. That is, since the trend plots of FIGS. 6A and 6B are grouped by bearings, each orbit-timebase plot following a trend plot includes data associated with the same bearing as the immediately preceding trend plot. In this manner, a user may evaluate the data analysis workspaces 46 for the same measurement points together to gain a more comprehensive understanding of the data. As such, the user may receive a more complete representation of a machine state.

Figure 9:
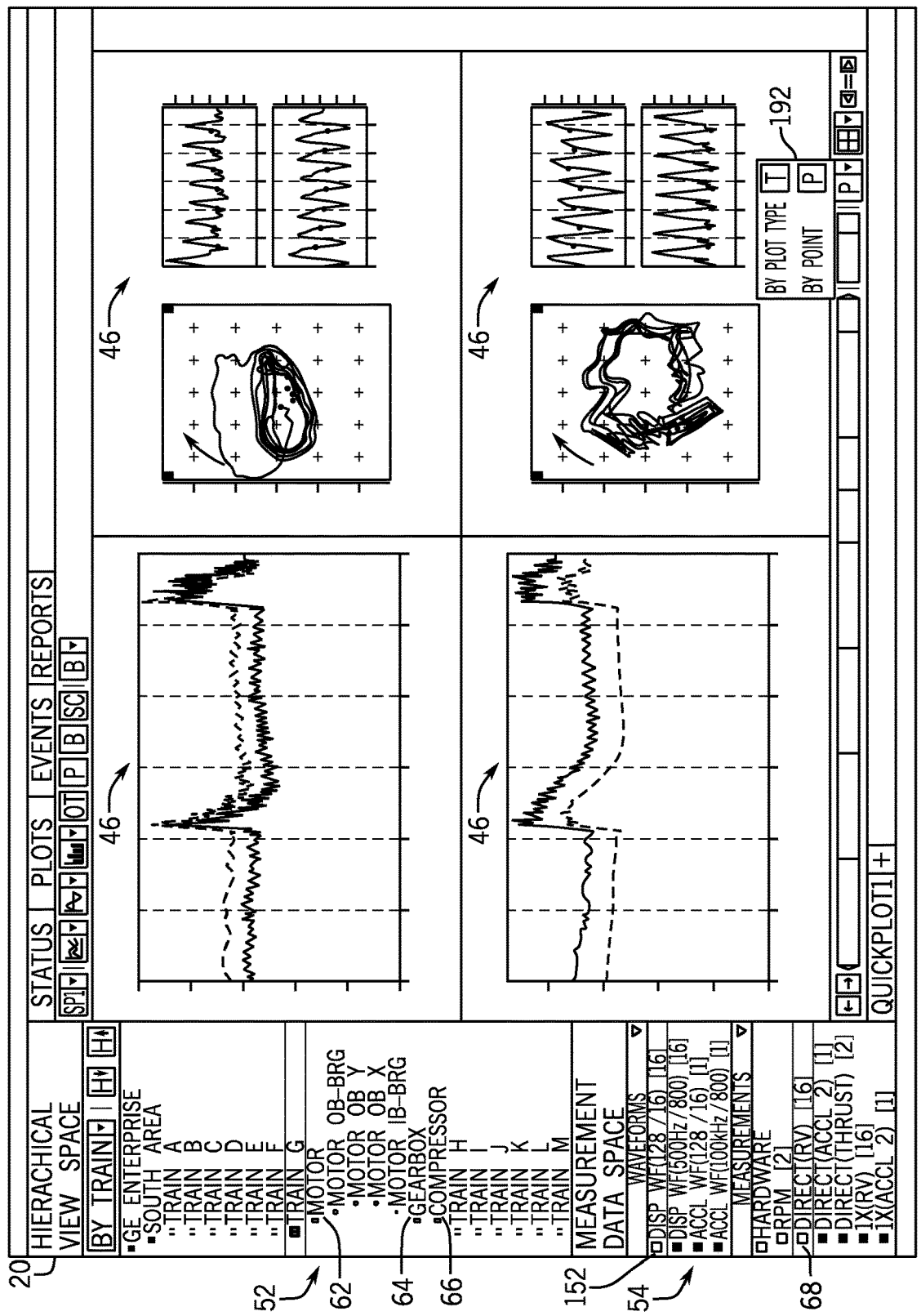
FIG. 9 illustrates a schematic view of a visualization providing an option to change an order mode for the plots of FIGS. 8A-8D, in accordance with embodiments presented herein.
Figure 10A:
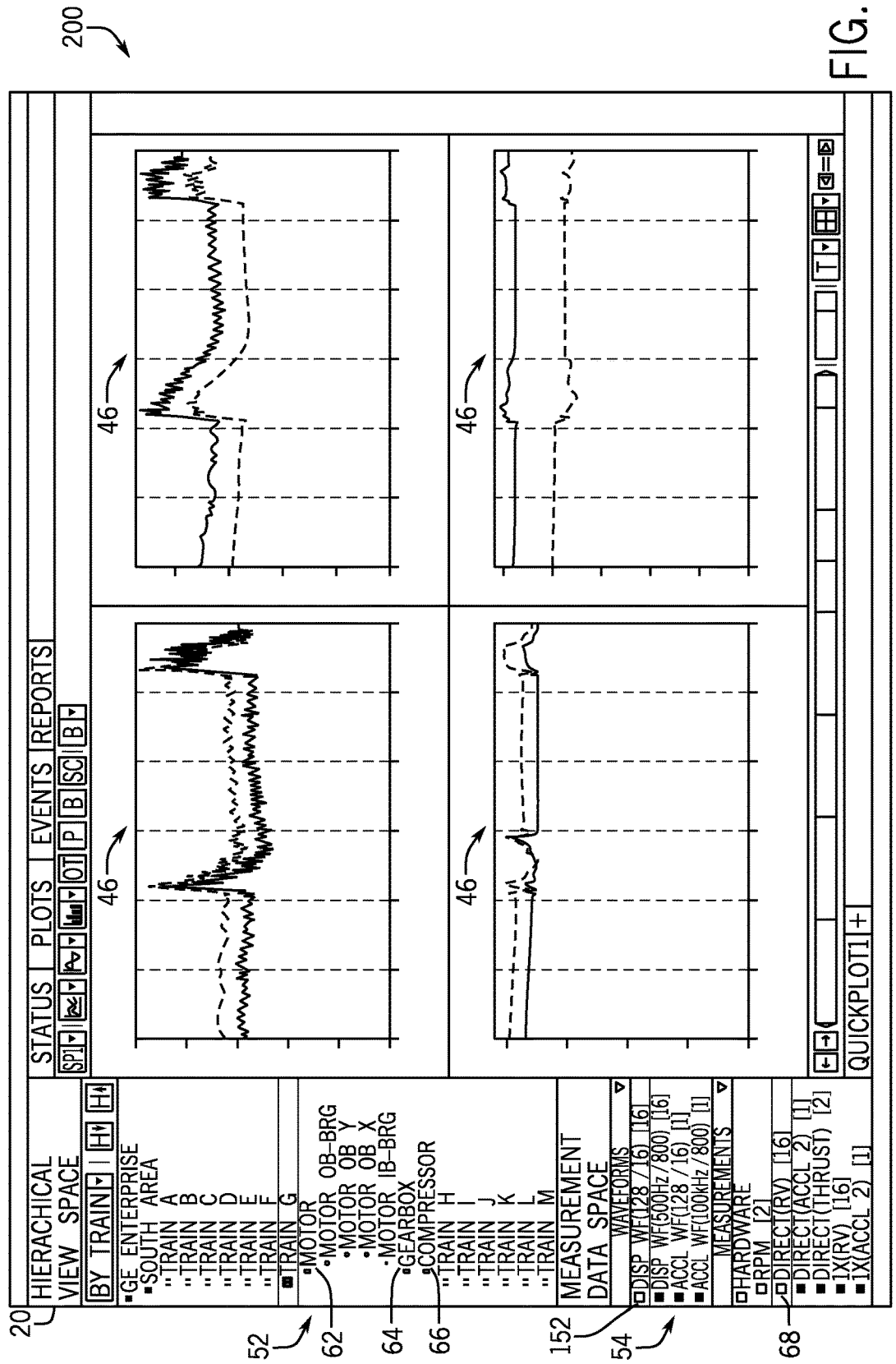
FIGS. 10A-10D illustrate schematic views of the plots of FIGS. 4A-4D along with the additional plots of FIGS. 8A-8D depicted according to a second order mode, in accordance with embodiments presented herein.
Figure 10B:
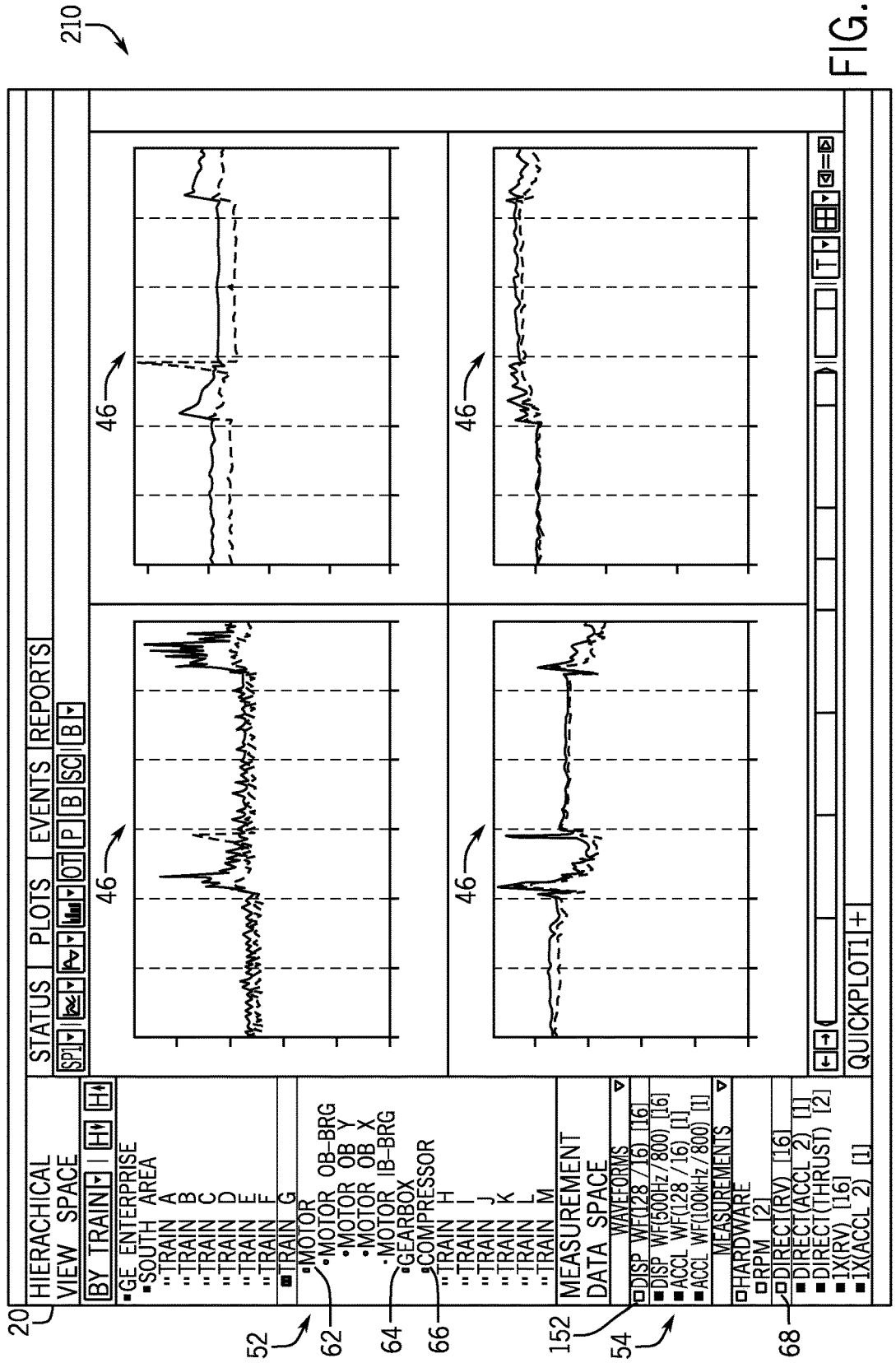
Figure 10C:
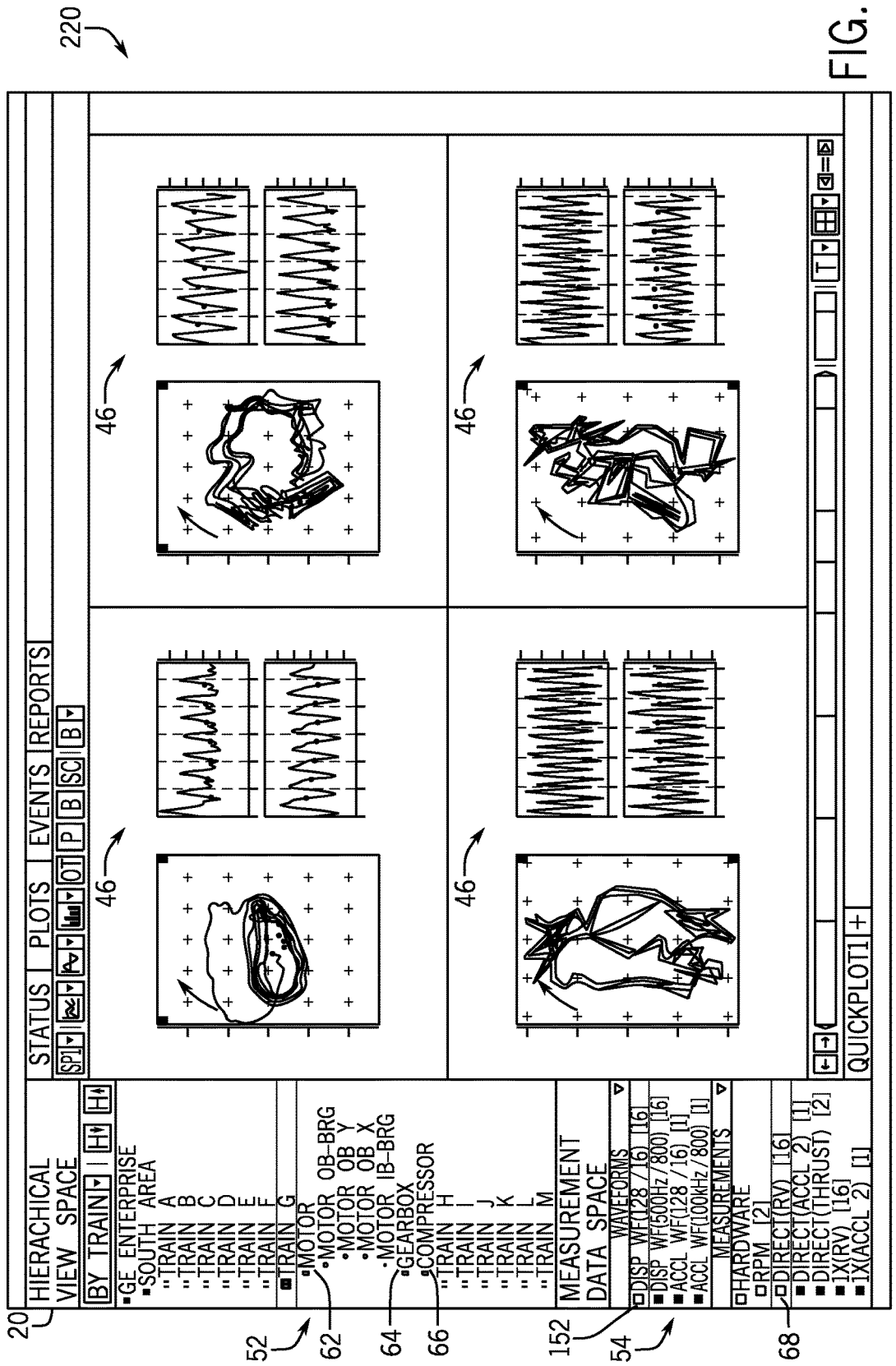
Figure 10D:
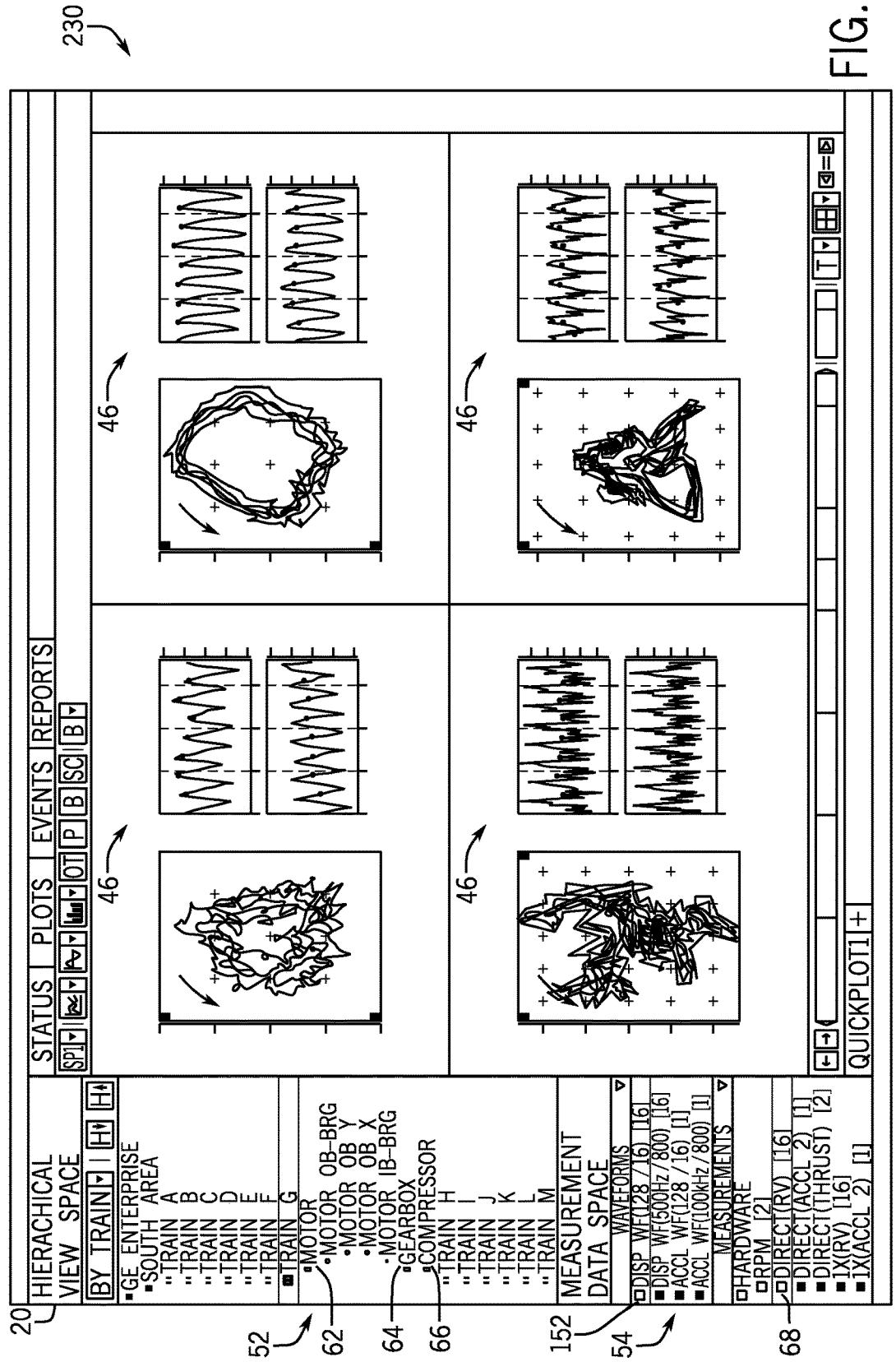

After the GUI 20 displays the data analysis workspaces 46 according to a first order, the GUI 20 may receive an input requesting that the currently displayed data analysis workspaces 46 be ordered according to a different mode. FIG. 9 illustrates a schematic view 190 of the data analysis workspaces 46 and a visualization 192 that provides options for displaying the data analysis workspaces 46 according to a particular order mode. As shown in FIG. 9, the visualization 192 provides an option to change the order mode in which the data analysis workspaces 46 may be ordered in the GUI 20. In one embodiment, the visualization 192 may include an option to order the data analysis workspaces 46 by plot type and an option to order the data analysis workspaces 46 by measurement points. As discussed above, ordering the data analysis workspaces 46 by measurement points may cause the GUI 20 to display the data analysis workspaces 46 according to an order that corresponds to the order values of the measurement points depicted in each data analysis workspace 46.

In addition to ordering the data analysis workspaces 46 by measurement points, the GUI 20 may order the data analysis workspaces 46 by plot type or data analysis type. That is, when the user selects to order the displayed data analysis workspaces 46 by plot type via the visualization 192, the GUI 20 may display the data analysis workspaces 46, such that each similar type of data analysis workspace 46 is displayed together.

Keeping the foregoing in mind, FIGS. 10A-10D illustrate schematic views 200, 210, 220, and 230 that depict the data analysis workspaces 46 of FIGS. 8A-8D ordered according to plot type. As such, schematic views 200 and 210 include data analysis workspaces 46 that correspond to the trend plots, and the schematic views 220 and 230 then include data analysis workspaces 46 that correspond to the orbit-timebase plots. As a result, the data analysis workspaces 46 are ordered by plot type. In this manner, a user may evaluate the data analysis workspaces 46 for the same plot type together to easily compare and contrast data across measurement points.

Technical effects of the embodiments presented in this disclosure include providing a user of the condition monitoring system 12 to group measurement points or measurement types on different plots, graphs, or other data analysis visualizations. That is, the data analysis visualizations provided by the condition monitoring system 12 may be grouped, for example, by machine, bearing, measurement point, or measurement type. As a result, the user may use this tool to both dictate how data analysis visualizations (e.g., plots) may be created in a data analysis workspace and to dynamically re-group measurement points or types on data analysis visualizations within the workspace in real-time.

By enabling a single data analysis workspace 46 to display multiple curves (e.g., stacked, overlaid) associated with different measurement points, the condition monitoring system 12 may enable the user to efficiently control how curves are grouped on the respective data analysis workspaces 46, and in turn, may reduce a number of data analysis workspaces 46 that may be created. As a result of displaying data analysis trends using fewer data analysis workspaces 46, the user may more efficiently and effectively group related measurement data together, thereby allowing the user to more easily perform data comparisons and obtain a broader understanding of a machine state.

Technical effects of the embodiments presented in this disclosure also include providing the user of the condition monitoring system 12 an efficient manner in which to alter the order of the data analysis workspaces 46. That is, by enabling the GUI 20 to display data analysis workspaces 46 to dynamically alter the order of the displayed data analysis workspaces 46, the GUI 20 may enable the user to view different presentations of related data associated with the same measurement points together.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a processor configured to receive a plurality of datasets in real time, each dataset of the plurality of datasets further comprising a plurality of measurement points associated with a device or one or more components within the device, wherein the device is configured to operate in an industrial environment, and wherein the plurality of datasets is acquired from a plurality of sensors disposed on the device or the one or more components of the device; and a graphical user interface (GUI), wherein the GUI includes an applicable content workspace displaying a plurality of data analysis workspaces, the GUI configured to:

receive a component selection in a hierarchical list provided within the GUI, the component selection specifying a component of the device and a bearing of the component, receive a measurement type selection from a list of measurement types provided in a measurement data space within the GUI, the list of measurement types associated with one or more measurement points of the component and the bearing, wherein the measurement type selection specifies a measurement type associated with the component and the bearing, receive a grouping mode input configured to specify grouping a first dataset of measurement points associated with the component and a second dataset of measurement points associated with the bearing in a first data analysis workspace, wherein the grouping mode input is configured to group at least two datasets that pertain to a particular measurement point together within at least one data analysis workspace, generate at least one two data analysis workspaces within the applicable content workspace based on a measurement point order associated with the first dataset, the second dataset and the grouping mode input, wherein the at least one data analysis workspace includes a first visualization associated with the first dataset and a second visualization associated with the second dataset, and display the first visualization and the second visualization within the at least one data analysis workspace upon receiving the grouping mode input, wherein the first visualization and the second visualization include a plurality of plots configured to illustrate various trends in the plurality of measurement points, spectrum information related to the plurality of measurement points, a plurality of historical values of the plurality of measurement points, one or more changes in the plurality of measurement points over time, of any combination thereof.

2. The system of claim 1, wherein the grouping mode input comprises a grouping by a type of device, by a type of component of the device, or any combination thereof.

3. The system of claim 1, wherein the device comprises a gasifier, a gas treatment unit, a machine, a motor, a gas turbine, a heat exchanger, a pump, a compressor, a fan, a generator, a steam turbine, a wind turbine, piping, or any combination thereof.

4. The system of claim 1, wherein the one or more components comprise one or more parts of the device.

5. The system of claim 1, wherein the one or more sensors comprise temperature sensors, current sensors, voltage sensors, pressure sensors, displacement sensors, vibration sensors, velocity sensors, acceleration sensors, torque sensors, flow sensors, clearance sensors, gas composition sensors, speed sensors, emissions sensors, or any combination thereof.

6. A non-transitory computer-readable medium comprising machine-readable instructions executable by a processor, wherein the machine-readable instructions are configured to cause the processor to:

receive a plurality of datasets in real time, from a plurality of measurement points associated with a device or one or more components within the device, wherein the device is configured to operate in an industrial environment, and wherein the plurality of datasets is acquired from a plurality of sensors disposed on the device or the one or more components of the device;

receive a component selection in a hierarchical list provided within the GUI, the component selection specifying a component of the device and a bearing of the component, receive a measurement type selection from a list of measurement types provided in a measurement data space within the GUI, the list of measurement types associated with one or more measurement points of the component and the bearing, wherein the measurement type selection specifies a measurement type associated with the component and the bearing, receive a grouping mode input configured to specify grouping a first dataset of measurement points associated with the component and a second dataset of measurement points associated with the bearing in a first data analysis workspace for display within at least one data analysis workspace included in a graphical user interface (GUI), wherein the GUI includes an applicable content workspace displaying a plurality of data analysis workspaces and wherein the grouping mode input is configured to group at least two datasets that pertain to a particular measurement point together within at least one data analysis workspace;

generate at least one data analysis workspace within the applicable content workspace based on a measurement point order associated with the first dataset and the second dataset and the grouping mode input, wherein the at least one data analysis workspace includes a first visualization associated with the first dataset and a second visualization associated with the second dataset; and display the first visualization and the second visualization within the at least one data analysis workspace upon receiving the grouping mode input, wherein the first visualization and the second visualization include a plurality of plots configured to illustrate various trends in the plurality of measurement points, spectrum information related to the plurality of measurement points, a plurality of historical values of the plurality of measurement points, one or more changes in the plurality of measurement points over time, of any combination thereof.

7. The non-transitory computer readable-medium of claim 6, wherein the grouping mode input comprises grouping by a device associated with the plurality of measurement points, grouping by a component associated with the plurality of measurement points, wherein the component is part of the device, or any combination thereof.

8. The non-transitory computer readable-medium of claim 6, wherein the at least one data processing output comprises one or more results of a data processing tool.

9. The non-transitory computer readable-medium of claim 6, wherein the plurality of plots includes at least one of a waveform plot, a spectrum plot, an orbit plot, a bode plot, a performance curve, a histogram, a bar graph, a circular plot, or a waterfall plot.

10. A method, comprising:

receiving a plurality of datasets in real time from a plurality of measurement points associated with a device or one or more components within the device, wherein the device is configured to operate in an industrial environment, and wherein the plurality of datasets is acquired from a plurality of sensors disposed on the device or the one or more components of the device;

receiving a component selection in a hierarchical list provided within the GUI, the component selection specifying a component of the device and a bearing of the component, receiving a measurement type selection from a list of measurement types provided in a measurement data space within the GUI, the list of measurement types associated with one or more measurement points of the component and the bearing, wherein the measurement type selection specifies a measurement type associated with the component and the bearing, receiving a grouping mode input configured to specify grouping a first dataset of measurement points associated with the component and a second dataset of measurement points associated with the bearing in a first data analysis workspace for display within at least one data analysis workspace included in a graphical user interface (GUI), wherein the GUI includes an applicable content workspace displaying a plurality of data analysis workspaces and wherein the grouping mode input is configured to group at least two datasets that pertain to a particular measurement point together within at least one data analysis workspace;

generating at least one data analysis workspace within the applicable content workspace based on a measurement point order associated with the first dataset and the second dataset and the grouping mode input, wherein the at least one data analysis workspace includes a first visualization associated with the first dataset and a second visualization associated with the second dataset; and displaying the first visualization and the second visualization within the at least one data analysis workspace upon receiving the grouping mode input, wherein the first visualization and the second visualization include a plurality of plots configured to illustrate various trends in the plurality of measurement points, spectrum information related to the plurality of measurement points, a plurality of historical values of the plurality of measurement points, one or more changes in the plurality of measurement points over time, of any combination thereof.

11. The method of claim 10, wherein the grouping mode input comprises a grouping by a type of device, by a type of component of the device, or any combination thereof.

12. The method of claim 10, wherein the first visualization and the second visualization comprise at least two overlaid plot types, wherein the at least two overlaid plot types are generated based on the respective measurement points associated with at least four datasets, and wherein the respective measurement points associated with the at least four datasets correspond to the received grouping mode input.

13. The method of claim 10, wherein the device comprises a gasifier, a gas treatment unit, a machine, a motor, a gas turbine, a heat exchanger, a pump, a compressor, a fan, a generator, a steam turbine, a wind turbine, piping, or any combination thereof.

14. The method of claim 10, wherein the plurality of plots comprises at least one of a trend plot, a spectrum plot, a historical value plot, a waveform plot, an orbit plot, a bode plot, a compressor performance curve, a pump performance curve, a histogram, a bar graph, a shaft centerline plot, a circular plot, a waterfall plot, or any combination thereof.

15. The method of claim 10, wherein the grouping mode input comprises a grouping by each measurement point of the plurality of measurement points.

* * * * *